US012669572B2

(12) United States Patent (10) Patent No.: US 12,669,572 B2
Hirabayashi (45) Date of Patent: Jun. 30, 2026

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventor: Takayuki Hirabayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 156 days.

(21) Appl. No.: 18/712,792

(22) PCT Filed: Oct. 27, 2022

(86) PCT No.: PCT/JP2022/040263
§ 371 (c)(1),
(2) Date: May 23, 2024

(87) PCT Pub. No.: WO2023/100561
PCT Pub. Date: Jun. 8, 2023

(65) Prior Publication Data
US 2025/0020763 A1 Jan. 16, 2025

(30) Foreign Application Priority Data
Dec. 1, 2021 (JP) ................................. 2021-195224

(51) Int. Cl.
*G01S 7/02* (2006.01)
*G01S 13/84* (2006.01)
(52) U.S. Cl.
CPC .............. *G01S 7/026* (2013.01); *G01S 13/84* (2013.01)
(58) Field of Classification Search
CPC ........ G01S 11/02; G01S 13/84; G01S 13/878; G01S 7/006; G01S 7/026; H01Q 13/08;
(Continued)

(56) References Cited

U.S. PATENT DOCUMENTS

2015/0346332 A1 12/2015 Taylor et al.
2019/0341993 A1* 11/2019 Karabinis .............. H04B 1/715
2020/0217951 A1* 7/2020 Park ...................... G01S 13/343

FOREIGN PATENT DOCUMENTS

JP 08-321799 A 12/1996
JP 2010-041566 A 2/2010
(Continued)

OTHER PUBLICATIONS

International Search Report and Written Opinion of PCT Application No. PCT/JP2022/040263, issued on Dec. 20, 2022, 10 pages of ISRWO.

*Primary Examiner* — Timothy A Brainard
(74) *Attorney, Agent, or Firm* — CHIP LAW GROUP

(57) ABSTRACT

A distance measuring device includes: a communication processing unit that performs first radio communication using right-handed circularly polarized waves and second radio communication using left-handed circularly polarized waves as communication for distance measurement using a phase-based method with another device; and a distance measuring unit that measures a distance to the other device based on a first time waveform obtained by performing inverse Fourier transform on frequency characteristics of a signal transmission path obtained based on a received signal by the first radio communication and a second time waveform obtained by performing inverse Fourier transform on frequency characteristics of a signal transmission path obtained based on a received signal by the second radio communication.

14 Claims, 27 Drawing Sheets

(58) Field of Classification Search
CPC . H01Q 21/24; H01Q 3/24; H01Q 9/16; H04B
7/10
See application file for complete search history.

(56) References Cited

FOREIGN PATENT DOCUMENTS

| | | | |
|----|--------------|----|---------|
| JP | 2011-529174  | A  | 12/2011 |
| JP | 2019-174416  | A  | 10/2019 |
| WO | 2021/171997  | A1 | 9/2021  |
| WO | 2021/193386  | A1 | 9/2021  |

* cited by examiner

3

ARITHMETIC PROCESSING UNIT

COMMUNICATION PROCESSING UNIT — F1

SWITCHING UNIT — F2

PHASE-TO-FREQUENCY CHARACTERISTIC ACQUISITION UNIT — F3

DISTANCE MEASURING UNIT — F4

RECEPTION FLAG BASED
ON FIRST TIME WAVEFORM

RECEPTION FLAG BASED
ON SECOND TIME WAVEFORM

DISTANCE MEASURING DEVICE AND DISTANCE MEASURING METHOD

CROSS REFERENCE TO RELATED APPLICATIONS

This application is a U.S. National Phase of International Patent Application No. PCT/JP2022/040263 filed on Oct. 27, 2022, which claims priority benefit of Japanese Patent Application No. JP 2021-195224 filed in the Japan Patent Office on Dec. 1, 2021. Each of the above-referenced applications is hereby incorporated herein by reference in its entirety.

TECHNICAL FIELD

The present technology relates to a distance measuring device and a mobile terminal device, and particularly relates to a technology for a distance measuring device and a mobile terminal device that measure distance by transmitting and receiving circularly polarized radio waves.

BACKGROUND ART

Distance measurement accuracy is important to appropriately measure the distance between devices.

PTL 1 listed below discloses a technique for improving distance measurement accuracy by switching directivity.

CITATION LIST

Patent Literature

[PTL 1] WO 2021/171997

SUMMARY

Technical Problem

However, when transmitting radio waves from one device to another, if the time when the other device receives direct waves is close to the time when the reflected waves are received, there is a possibility that direct waves cannot be extracted sufficiently just by switching the directivity.

The present technology aims to solve the above-mentioned problems, and an object thereof is to improve distance measurement accuracy.

Solution to Problem

A distance measuring device according to the present technology includes: a communication processing unit that performs first radio communication using right-handed circularly polarized waves and second radio communication using left-handed circularly polarized waves as communication for distance measurement using a phase-based method with another device; and a distance measuring unit that measures a distance to the other device based on a first time waveform obtained by performing inverse Fourier transform on frequency characteristics of a signal transmission path obtained based on a received signal by the first radio communication and a second time waveform obtained by performing inverse Fourier transform on frequency characteristics of a signal transmission path obtained based on a received signal by the second radio communication.

For example, direct-wave components from other devices can be identified using a first time waveform when receiving circularly polarized radio waves that are easier for the antenna to receive among right-handed circularly polarized waves and left-handed circularly polarized waves and a second time waveform when receiving circularly polarized radio waves that are harder for the antenna to receive (or vice versa).

A distance measuring method of the present technology allows an arithmetic processing device to execute: communication processing of performing first radio communication using right-handed circularly polarized waves and second radio communication using left-handed circularly polarized waves as communication for distance measurement using a phase-based method with another device; and processing of measuring a distance to the other device based on a first time waveform obtained by performing inverse Fourier transform on frequency characteristics of a signal transmission path obtained based on a received signal by the first radio communication and a second time waveform obtained by performing inverse Fourier transform on frequency characteristics of a signal transmission path obtained based on a received signal by the second radio communication.

DESCRIPTION OF EMBODIMENTS

Hereinafter, embodiments will be described in the following order.

<1. Communication mode using circular polarization>
<2. Configuration of distance measuring device>
<3. Distance measurement and positioning using phase-based method>
<4. Direct-wave component identification method>
<4-1. First method>
<4-2. Second method>
<4-3. Distance measurement method>
<5. Processing flow>
<6. Modified example>
<6-1. First modified example>
<6-2. Second modified example>
<6-3. Third modified example>
<6-4. Fourth modified example>
<6-5. Others>
<7. Summary>
<8. Present technology>

1. Communication Mode Using Circular Polarization

In order to alleviate the decrease in distance measurement accuracy due to multipath, in the present embodiment, communication is performed using circularly polarized radio waves.

First, transmission and reception using circularly polarized waves in an ideal environment will be explained with reference to FIG. 1.

Figure 1:
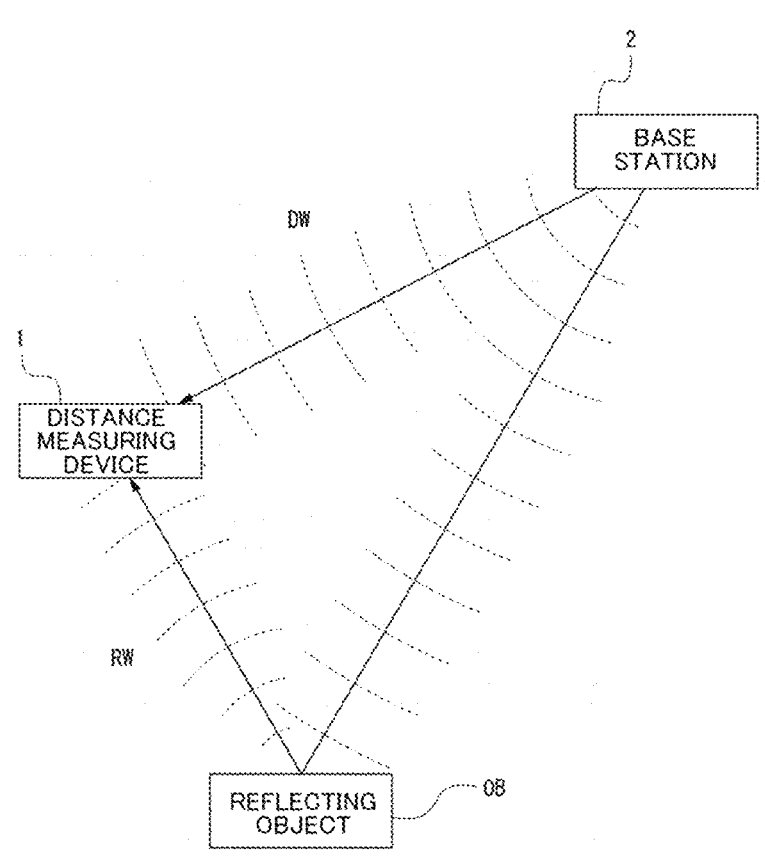
FIG. 1 is an example of how radio waves are transmitted and received in an embodiment of the present technology, and is a diagram showing how a distance measuring device receives a direct wave and a reflected wave reflected by a reflecting object.

FIG. 1 is a diagram showing an environment for accurately measuring the position information of a distance measuring device 1, which is a mobile terminal such as a smartphone possessed by a user.

The distance measuring device 1 measures the distance to a base station 2 by transmitting and receiving radio waves to and from the base station 2 whose position information is known. Furthermore, it is also possible to specify (estimate) its own position information by measuring distances to a plurality of base stations 2.

The base station 2 radiates right-handed circularly polarized (RHCP) radio waves, and the distance measuring device 1 receives the right-handed circularly polarized waves.

Here, since there is a reflecting object OB that is a perfect conductor around the distance measuring device 1 and the base station 2, the distance measuring device 1 receives only the direct wave DW in the radio waves transmitted from the base station 2 but also the reflected wave RW reflected at the reflecting object OB.

When the RHCP radio wave radiated from the base station 2 is specularly reflected by the reflecting object OB, it changes into a left-handed circularly polarized wave (LHCP) and is received by the distance measuring device 1.

Therefore, by adopting a configuration in which the distance measuring device 1 can receive only RHCP radio waves, it is possible to avoid receiving reflected waves once. As a result, the direct-wave component can be detected with high accuracy, so the distance between the distance measuring device 1 and the base station 2 can be calculated with high accuracy, and highly accurate position information of the distance measuring device 1 can be obtained.

However, in an actual environment, perfect specular reflection does not necessarily occur at the reflecting object OB, so the reflected wave at the reflecting object OB is not a perfect LHCP radio wave. Therefore, the distance measuring device 1 receives not only the direct wave but also the once-reflected wave component, resulting in a decrease in distance measurement accuracy.

In order to solve this problem, the distance measuring device 1 has a configuration described below.

2. Configuration of Distance Measuring Device

The distance measuring device 1 is a computer device that performs various calculations. An example of the hardware configuration of the computer device will be described with reference to FIG. 2.

A CPU (Central Processing Unit) 71 of a computer device functions as an arithmetic processing unit that performs various processes, and executes various processes according to a program stored in a ROM (Read Only Memory) 72, a non-volatile memory unit 74 such as or an EEP-ROM (Electrically Erasable Programmable Read-Only Memory), or a program loaded into a RAM (Random Access Memory)

73 from a storage unit 79. The RAM 73 appropriately stores not only data used for the CPU 71 to perform various processes but also necessary data or the like.

The CPU 71 may be implemented as a DSP (Digital Signal Processor) or the like. The CPU 71 performs processing of identifying a direct-wave component by performing signal processing to be described later, and also performs processing related to distance measurement.

The CPU 71, ROM 72, RAM 73, and nonvolatile memory unit 74 are interconnected via a bus 83. An input/output interface (I/F) 75 is also connected to this bus 83.

An input unit 76 constituted by an operator or an operation device is connected to the input/output interface 75.

For example, various operators or operation devices such as a keyboard, a mouse, keys, a dial, a touch panel, a touch pad, and a remote controller are assumed as the input unit 76.

A user operation is detected by the input unit 76, and a signal corresponding to the input operation is interpreted by the CPU 71.

Further, a display unit 77 formed of an LCD or an organic EL (Electronic Luminescent) panel, and a sound output unit 78 formed of a speaker or the like are connected integrally or separately to the input/output interface 75.

The display unit 77 is a display unit that performs various displays, and is configured of, for example, a display device provided in the housing of the computer device or a separate display device connected to the computer device.

The display unit 77 displays images for various image analysis processes, moving images to be processed, and the like on the display screen based on instructions from the CPU 71. Further, the display unit 77 displays various operation menus, icons, messages, and the like, that is, as a GUI (Graphical User Interface), based on instructions from the CPU 71.

The storage unit 79 constituted by a hard disk, a solid-state memory, or the like, or a communication unit 80 constituted by a modem or the like may be connected to the input/output interface 75.

The communication unit 80 performs communication processing over a transmission path such as the Internet, communication such as wired/radio communication or bus communication with various types of devices, and the like. The distance measuring device 1 according to the present embodiment is equipped with an antenna unit, various switches, and the like, which will be described later, as the communication unit 80, so that it is possible to transmit and receive at least one of RHCP and LHCP radio waves.

A drive 81 is also connected to the input/output interface 75 as necessary, and a removable storage medium 82 such as a magnetic disk, an optical disc, a magneto-optical disc, or a semiconductor memory is mounted in the drive 81 as appropriate. The drive 81 can read data files such as programs used for each process from the removable storage medium 82. The read data file is stored in the storage unit 79 or an image or a sound included in the data file is output to the display unit 77 or the sound output unit 78. A computer program or the like read from the removable storage medium 82 is installed to the storage unit 79 as necessary.

In this computer device, for example, software for processing in the present embodiment can be installed through network communication using the communication unit 80 or via the removable storage medium 82. Alternatively, the software may be stored in advance in the ROM 72, the storage unit 79, or the like.

By the CPU 71 performing processing operations based on various programs, necessary information processing and communication processing are executed in various information processing devices equipped with an arithmetic processing unit, which will be described later.

Figure 2:
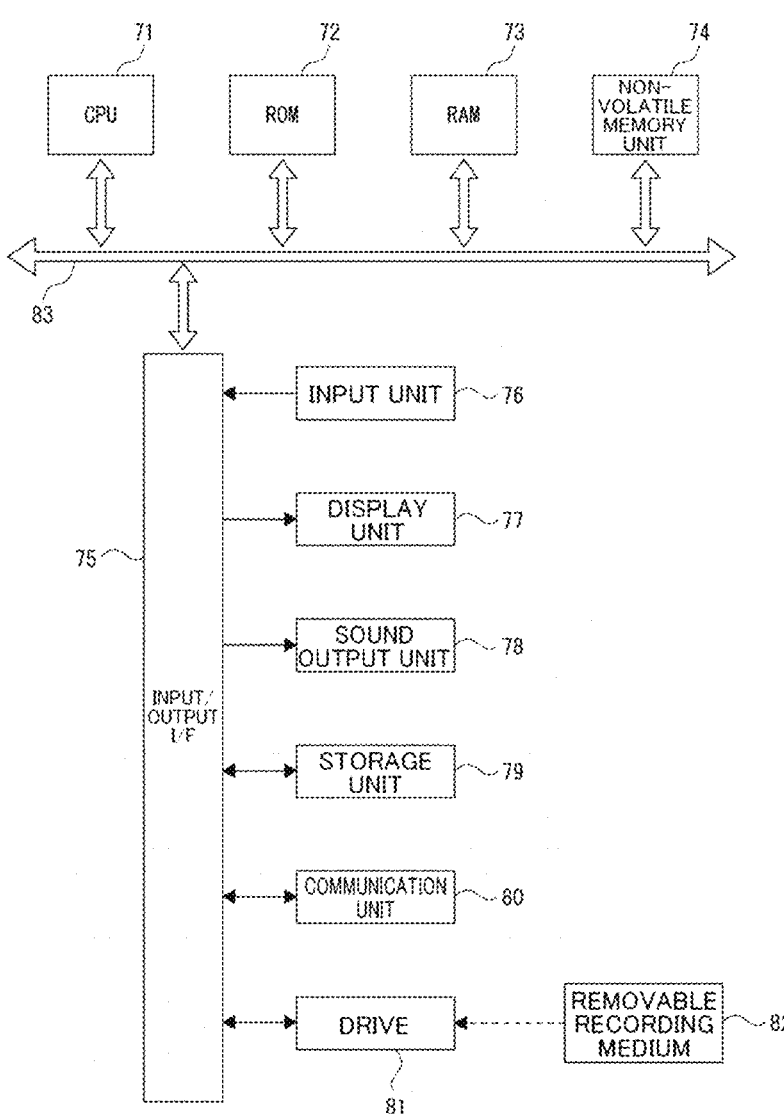
FIG. 2 is a block diagram of a computer device.

Note that the information processing device is not limited to being configured by a single computer device as shown in FIG. 2, but may be configured by systemizing a plurality of computer devices. The plurality of computer devices may be systemized using a LAN (Local Area Network) or the like, or may be placed at a remote position via a VPN (Virtual Private Network) using the Internet or the like. The plurality of computer devices may include computer devices as a server group (cloud) that can be used by a cloud computing service.

Figure 3:
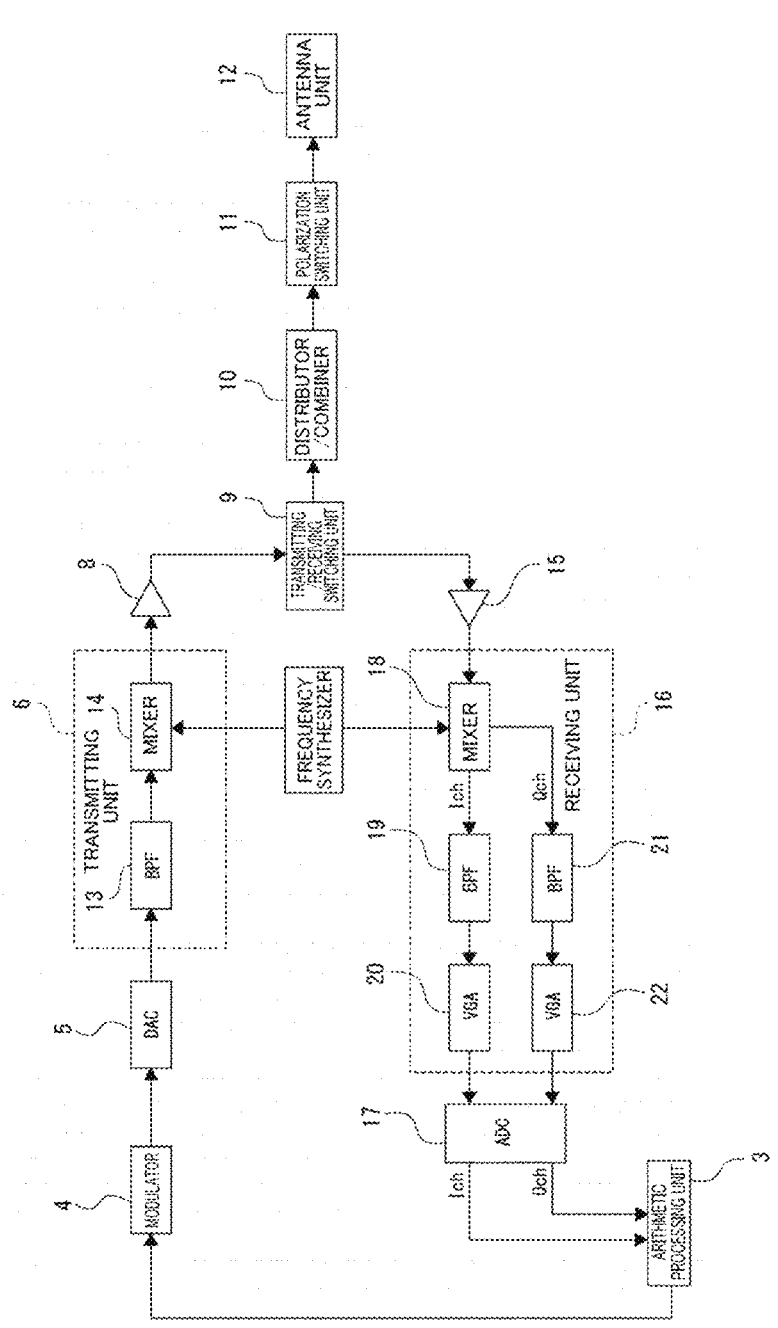
FIG. 3 is a block diagram of each part included in the distance measuring device for transmitting and receiving radio waves.

FIG. 3 shows a specific example of the configuration of the distance measuring device 1 or the base station 2 for measuring distance by transmitting and receiving circularly polarized radio waves.

In order to transmit circularly polarized radio waves, the distance measuring device 1 includes an arithmetic processing unit 3, a modulator 4, a DAC (Digital to Analog Converter) 5, a transmitting unit 6, a frequency synthesizer 7, a transmission amplifier 8, a transmission/reception switching unit 9, a distributor/combiner 10, a polarization switching unit 11, and an antenna unit 12.

The distance measuring device 1 in this example is capable of performing radio communication according to the BLE (Bluetooth Low Energy: Bluetooth is a registered trademark) system, for example. With the BLE method, it is possible to reduce the time required for operations that require a large amount of power, such as connection establishment and data communication, as much as possible. Therefore, power consumption can be suppressed, and the distance measuring device 1 can be downsized.

The arithmetic processing unit 3 supplies transmission target data to the modulator 4.

The modulator 4 performs signal modulation processing of radio communication with other devices such as the base station 2. Here, it is assumed that, for example, IQ modulation is performed as the modulation processing. In IQ modulation, I-channel (In-phase: in-phase component) and Q-channel (Quadrature: orthogonal component) signals are used as baseband signals.

Specifically, the modulator 4 performs modulation processing as IQ modulation on the transmission target data supplied from the arithmetic processing unit 3.

The DAC 5 converts the digital signal from the modulator 4 into an analog signal. The analog signal converted by this DAC 5 is supplied to the transmitting unit 6.

The transmitting unit 6 is a block that transmits signals through communication using radio waves. As illustrated in the figure, the transmitting unit 6 includes a BPF (Band Pass Filter) 13 and a mixer 14. The BPF 13 passes only signals in a specific frequency band. That is, the BPF 13 supplies only signals in a specific frequency band to the mixer 14 among the analog signals from the DAC 5.

The mixer 14 mixes the local oscillation frequency supplied from the frequency synthesizer 7 with the signal supplied from the BPF 13, thereby converting the signal into a transmission frequency for radio communication.

The frequency synthesizer 7 supplies frequencies used during transmission and reception. Specifically, the frequency synthesizer 7 includes a local oscillator therein, and is used for converting a radio frequency signal and a baseband signal for radio communication.

The transmission amplifier 8 amplifies the signal output from the transmitting unit 6.

The transmission/reception switching unit 9 is a switch that switches radio frequency (RF) signals. The transmission/reception switching unit 9 connects the transmitting unit 6 to the distributor/combiner 10 when transmitting data, thereby enabling the transmission of radio waves from the antenna unit 12, and connects the receiving unit 16 (to be described later) to the distributor/combiner 10 when receiving data, thereby enabling the reception of radio waves in the antenna unit 12.

When transmitting data, the distributor/combiner 10 outputs a signal obtained by distributing the signal output from the transmission/reception switching unit 9 into two systems.

The polarization switching unit 11 applies a predetermined delay to one of the two systems of signals output from the distributor/combiner 10. For example, a delay is applied so that the phase difference between the two systems of signals is 90 degrees. Two electric wires (feeding lines) are connected to the antenna unit 12, and switching between RHCP and LHCP for radio waves is performed depending on which of the two electric wires the delayed signal is to be supplied to.

The configuration of the distributor/combiner 10 and the polarization switching unit 11 will be described in detail again.

The antenna unit 12 includes one or more antennas for transmitting and receiving signals by radio communication. The antenna unit 12 in the present embodiment is configured to include one antenna.

In order to receive circularly polarized radio waves, the distance measuring device 1 includes an arithmetic processing unit 3, a transmission/reception switching unit 9, a distributor/combiner 10, a polarization switching unit 11, an antenna unit 12, a reception amplifier 15, a receiving unit 16, and an ADC (Analog to Digital Converter) 17.

The receiving unit 16 is a block that receives signals through radio wave communication. As shown in FIG. 3, the receiving unit 16 includes a mixer 18, a BPF 19, a VGA (Variable Gain Amplifier) 20, a BPF 21, and a VGA 22.

The antenna unit 12 receives RHCP or LHCP radio waves and outputs them to the polarization switching unit 11 via two electric wires.

The polarization switching unit 11 applies a delay to one of the two systems of received signals output from the antenna unit 12 and outputs the signal to the subsequent distributor/combiner 10. At this time, depending on which of the two systems of received signals a delay is applied to, the received signal of the RHCP radio waves is strengthened, or the received signal of the LHCP radio waves is strengthened.

The distributor/combiner 10 combines the two systems of signals output from the polarization switching unit 11 into one system of signals, and outputs the signal to the reception amplifier 15 via the transmission/reception switching unit 9.

The reception amplifier 15 amplifies the signal output from the transmission/reception switching unit 9. The mixer 18 mixes the local oscillation frequency supplied from the frequency synthesizer 7 with the signal supplied from reception amplifier 15, thereby converting the signal into I-channel and Q-channel signals. The I-channel signal (denoted as "Ich" in the figure) is supplied to the BPF 19, and the Q-channel signal (denoted as "Qch" in the figure) is supplied to the BPF 21.

The I-channel signal obtained by the mixer 18 is input to the BPF 19, where only signals in a specific frequency band are extracted and supplied to the VGA 20. On the other hand, the Q-channel signal obtained by the mixer 18 is input to the BPF 21, where only signals in a specific frequency band are extracted and supplied to the VGA 22.

The VGA 20 and VGA 22 function as analog variable gain amplifiers that adjust the gains of the I-channel signal supplied from the BPF 19 and the Q-channel signal supplied from the BPF 21, respectively.

The ADC 17 converts the I-channel and Q-channel signals from the receiving unit 16, that is, the I-channel and Q-channel signals output via the VGA 20 and VGA 22, from analog signals to digital signals.

The I-channel and Q-channel signals converted into digital signals are supplied to the arithmetic processing unit 3.

The arithmetic processing unit 3 performs processing such as demodulating the received data based on the data of the I-channel and Q-channel signals supplied from the ADC 17. Further, as described above, the arithmetic processing unit 3 performs processing of supplying the transmission target data to the modulator 4 and modulating the data.

The arithmetic processing unit 3 performs processing such as demodulating the received data based on the data of the I-channel and Q-channel signals supplied from the ADC 17. Further, as described above, the arithmetic processing unit 3 performs processing of supplying the transmission target data to the modulator 4 and modulating the data.

Figure 4:
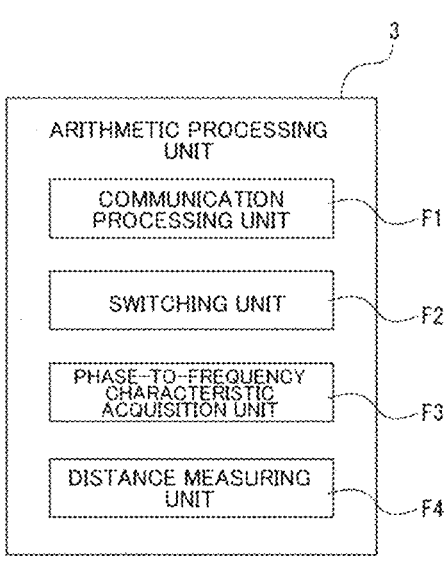
FIG. 4 is a functional block diagram of an arithmetic processing unit.

Note that, as shown in FIG. 4, the arithmetic processing unit 3 of the distance measuring device 1 in this example has a function as a communication processing unit F1, a function as a switching unit F2, a function as a frequency-phase characteristic acquisition unit F3, and a function as a distance measuring unit F4, as functions for performing distance measurement using radio communication.

The communication processing unit F1 performs processing of supplying transmission target data to the modulator 4, processing of demodulating received data based on the data of the I-channel and Q-channel signals, and processing of switching between a transmission mode and a reception mode for each unit.

The switching unit F2 performs processing of switching between a first mode M1 in which communication is performed using RHCP radio waves and a second mode M2 in which communication is performed using LHCP radio waves.

The phase-to-frequency characteristic acquisition unit F3 acquires the phase characteristics with respect to the frequency, of a signal propagation path between the communication device and another communication device (for example, the base station 2).

In this example, in order to perform distance measurement using a phase-based method as distance measurement using radio communication, processing of obtaining the phase characteristics of a signal propagation path with respect to the frequency is performed.

Note that the distance measurement method using the phase-based method will be explained later.

The distance measuring unit F4 calculates the distance to another communication device based on the phase characteristics of the signal propagation path with respect to the frequency acquired by the frequency-phase characteristic acquisition unit F3. Note that the distance calculation method by the distance measuring unit F4 will also be described later.

3. Distance Measurement and Positioning Using Phase-Based Method

Figure 5:
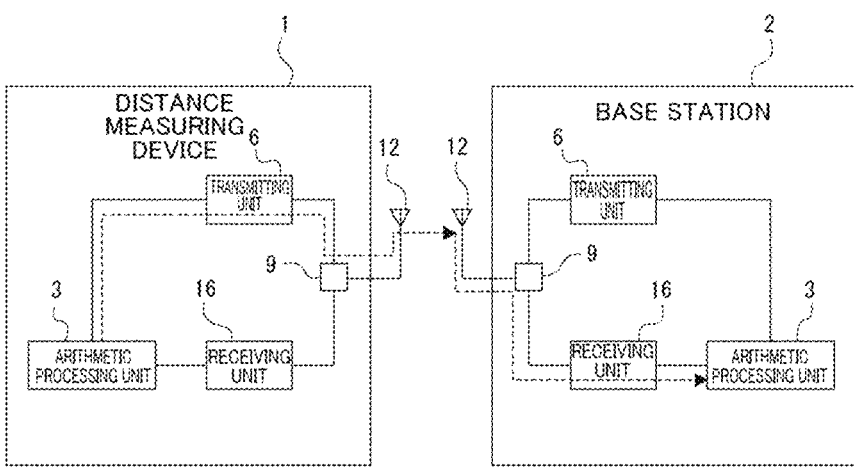
FIG. 5 is a diagram showing an example of phase measurement in a phase-based method, and this figure shows a case where radio waves are transmitted from a distance measuring device to a base station.
Figure 6:
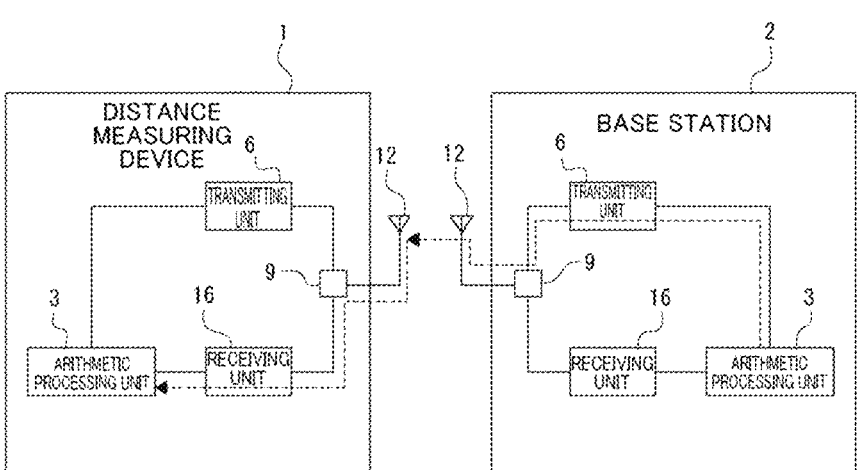
FIG. 6 is a diagram showing an example of phase measurement in a phase-based method, and this figure shows a case where the distance measuring device receives radio waves from a base station.

FIGS. 5 and 6 are diagrams showing examples of phase measurement in the phase-based method. Note that the phase-based method is a technology that can be implemented without using circularly polarized radio waves. In the following description, an example using RHCP radio waves will be given.

In the phase-based method, a phase is measured based on the results of communication using RHCP radio waves while changing the frequency between two devices (in FIG. 5, between the distance measuring device 1 and the base station 2). In this case, first, as shown in FIG. 5, a measurement signal is transmitted from the distance measuring device 1 (initiator) to the base station 2 (reflector).

The initiator here refers to a device that performs distance calculation processing based on the measured phase, and the reflector refers to a device paired with the initiator that exchanges measurement signals with the initiator.

Note that FIGS. 5 and 6 mainly show the flow of measurement signals related to phase measurement, and the illustration of, for example, the modulator 4, DAC 5, frequency synthesizer 7, transmission amplifier 8, distributor/combiner 10, polarization switching unit 11, and ADC 17 is omitted.

In FIG. 5, in the distance measuring device 1 as an initiator, a measurement signal is transmitted from the arithmetic processing unit 3 via the transmitting unit 6 from an antenna included in the antenna unit 12. Furthermore, in the base station 2 as a reflector, the measurement signal is received by the receiving unit 16 via the antenna included in the antenna unit 12.

Then, as shown in FIG. 6, a measurement signal is sent back from the base station 2 to the distance measuring device 1. That is, in the base station 2, the measurement signal is transmitted from the arithmetic processing unit 3 via the transmitting unit 6 from the antenna of the antenna unit 12. In the distance measuring device 1, the measurement signal is received by the receiving unit 16 via the antenna of the antenna unit 12. The phase characteristics between the two devices are measured in the arithmetic processing unit 3.

By performing round-trip communication in this manner, it becomes possible to appropriately measure the phase characteristics between the two devices.

Figure 7:
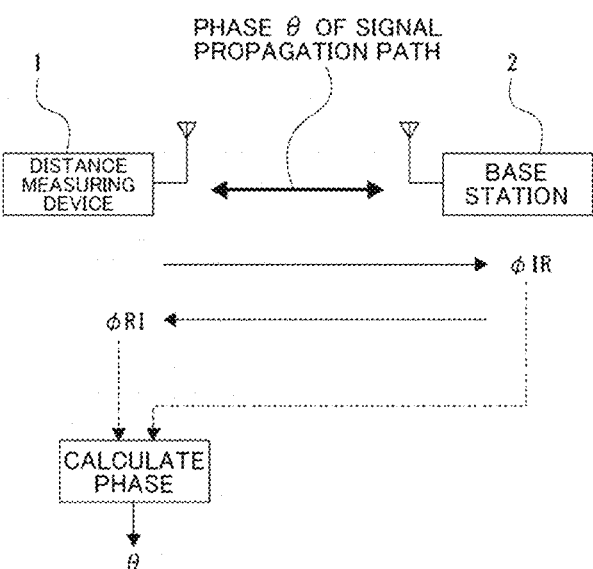
FIG. 7 is an explanatory diagram of the phase of a signal propagation path measured in the phase-based method.

FIG. 7 is an explanatory diagram of the phase θ of the signal propagation path measured in the phase-based method.

When a measurement signal is transmitted from the distance measuring device 1 side to the base station 2 side as shown in FIG. 5, the signal phase φ of the measurement signal is measured at the base station 2. Here, the signal phase φ measured when the measurement signal is transmitted from the distance measuring device 1 (initiator) side to the base station 2 (reflector) side is expressed as "φIR" here.

Further, when a measurement signal is transmitted from the base station 2 side to the distance measuring device 1 side as shown in FIG. 6B, the signal phase φ of the measurement signal is measured in the distance measuring device 1. The signal phase φ measured when the measurement signal is transmitted from the base station 2 side to the distance measuring device 1 side in this way is expressed as "φRI".

Here, the signal phase φ is determined by the following [Equation 1] when the I-channel and Q-channel signals obtained by receiving the measurement signal are respectively "I" and "Q".

$$\varphi = \arctan(Q/I) \qquad \text{[Equation 1]}$$

In the phase-based method, the phase θ of the signal propagation path is determined based on the signal phase φIR and the signal phase φRI described above. Specifically, the phase θ is determined by averaging the signal phase φIR and the signal phase φRI. As the averaging operation here, in addition to calculating the average value of the signal phase φIR and the signal phase φRI, it is also possible to perform an operation of adding the signal phase φIR and the signal phase φRI.

In the phase-based method, the above-described measurement of the phase θ is performed for each frequency while sequentially changing the frequency of the measurement signal within a predetermined frequency band. In other words, the phase θ is measured for each of a plurality of frequencies. Note that the "predetermined frequency band" here may be a frequency band determined as a usage band according to communication standards, such as the 2.4 GHz band (band from 2400 MHz to 2480 MHz) in the case of BLE.

When the phase θ is measured for each frequency within a predetermined frequency band as described above, measurement results as illustrated in FIG. 8 are obtained. The black circles in the figure represent the measurement results of the phase θ at each frequency.

Figure 8:
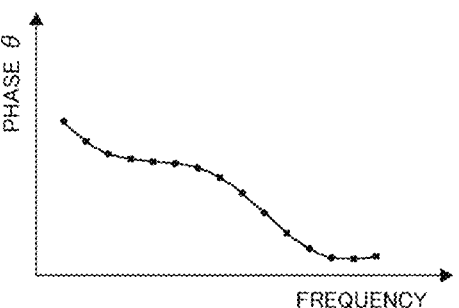
FIG. 8 is a diagram illustrating frequency-phase characteristics when a communication device is displaced.

The results shown in FIG. 8 can be expressed as phase characteristics of the signal propagation path with respect to frequency.

Figure 9:
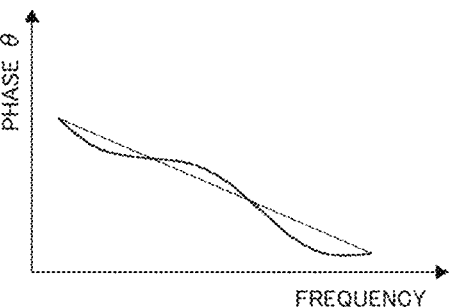
FIG. 9 is a diagram illustrating the slope calculated from the phase characteristics.

In the phase-based method, distance measurement is performed based on how the phase θ changes when the frequency changes. Specifically, in the characteristics of the phase θ with respect to changes in frequency, the magnitude of the slope of the phase θ as shown in FIG. 9 correlates with the magnitude of the distance. At this time, the steeper the slope of the phase θ, the greater the distance. Therefore, the distance can be calculated based on the slope of the phase θ.

An example of a specific distance calculation method is to obtain the group delay τ from the slope of the phase θ and multiply the group delay τ by the speed of light (=299792458 m/s). The reason why the group delay τ is used is to eliminate the influence of 2π indeterminacy of the phase. Note that the group delay τ is obtained by differentiating the phase θ with respect to the angular frequency ω.

Here, the distance calculation method based on the characteristics of phase θ with respect to frequency, that is, the phase characteristics of the signal propagation path with respect to frequency is not limited to the above-mentioned method, and various methods can be considered.

For example, as an example of a method of acquiring not only the characteristics of the phase θ with respect to the frequency but also the characteristics of the amplitude with respect to the frequency, in other words, not only the frequency characteristics of the phase θ but also the frequency characteristics of the amplitude, a method may be considered in which a waveform is obtained from these frequency characteristics of phase θ and amplitude (a waveform with the horizontal axis as the time axis and the vertical axis as the signal intensity, hereinafter referred to as "time waveform") by inverse Fourier transform such as IFFT (Inverse Fast Fourier Transform) and the distance is calculated based on the time waveform.

Since the phase θ changes depending on the frequency, distance measurement using the phase-based method is theoretically possible by measuring the phase θ for at least two or more frequencies.

In the phase-based method, as described in FIG. 6, the distance is calculated by determining the phase θ from the measurement results of the signal phase w in both directions from the distance measuring device 1 to the base station 2 and from the base station 2 to the distance measuring device 1. In other words, this can be said to be a method of determining the distance based on relative difference information of the signal phase φ. Therefore, the phase-based method has the advantage that it is possible to prevent the distance measurement accuracy from decreasing due to the absolute value of the circuit delay of each block related to signal transmission and reception and the variation value due to temperature characteristics.

Figure 10:
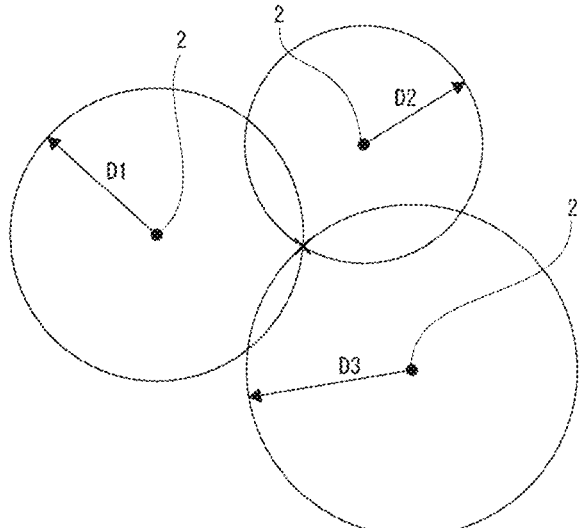
FIG. 10 is an explanatory diagram for explaining an example of a positioning method, and this figure shows a state in which the positioning method is used in an ideal state.
Figure 11:
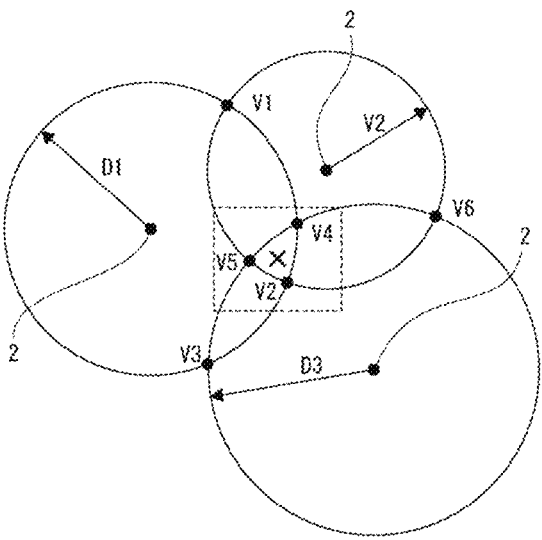
FIG. 11 is an explanatory diagram for explaining an example of a positioning method, and this figure shows a state in which the positioning method is used in a state including an error.

Next, positioning will be explained with reference to FIGS. 10 and 11.

For example, if the distance measuring device 1 can measure distances to at least three base stations 2 and determine the distances D to the three base stations 2 can be determined, the position of the distance measuring device 1 can be determined by triangulation. Specifically, since the position of each base station 2 is known, the position of the distance measuring device 1 can be, as shown in FIG. 10, determined as the intersection point (x mark in the figure) of three circles which are centered on the positions of each base station 2 and whose radii are the distances D (D1, D2, and D3 in the figure) to the base stations 2.

However, in reality, it is rare for the three circles to intersect at one point. That is, even if the circles intersect, there are usually a plurality of intersection points V. FIG. 11 shows a state in which three circles do not intersect at one point, but a total of six intersection points V1, P2, P3, P4, P5, and P6 are created by these three circles. In this case, based on the region formed by these intersection points V, the position of the positioning target device (that is, the distance measuring device 1) can be calculated. Specifically, a method can be used in which, among the three points that can be selected from the six intersection points V, the three points that have the smallest area of the triangle formed by connecting each point, in other words, three intersection points V (in the illustrated example, three points of intersection points V2, P4, and P5) that form the part where three circles overlap are specified, and the position of the center of gravity of a triangle formed by these three points is obtained as the position of the positioning target device.

Note that the positioning calculation method for specifying the position of the positioning target device using the distances D to the plurality of base stations 2 is limited to the positioning calculation method using the center of gravity method (centroid method) as described above. The method can be considered in a variety of ways, and is not limited to a specific method.

The present embodiment has a configuration that reduces the influence of multipath, which is a problem when performing distance measurement or positioning as described above.

Specifically, since the distance measuring device 1 includes the distributor/combiner 10 and the polarization switching unit 11, it is possible to specify the direct-wave component, so that the influence of multipath can be reduced.

Specifically, this will be explained with reference to FIG. 12. In addition, in FIG. 12, the arithmetic processing unit 3, the transmission/reception switching unit 9, the distributor/combiner 10, the polarization switching unit 11, and the antenna unit 12 are shown as excerpts. That is, the configuration of each unit provided between the arithmetic processing unit 3 and the transmission/reception switching unit 9 is omitted from illustration in FIG. 12.

The transmission/reception switching unit 9 is configured as, for example, an SPDT (Single-Pole/Double-Throw) switch, and switches between a transmission mode and a reception mode based on a transmission/reception switching signal S1 supplied from the arithmetic processing unit 3.

First, the operation of each unit when switched to the transmission mode will be explained.

When switched to the transmission mode by the transmission/reception switching signal S1, the transmission/reception switching unit 9 outputs the signal from the transmission amplifier 8 to the distributor/combiner 10 at the subsequent stage.

As described above, when transmitting data, the distributor/combiner 10 distributes the signal output from the transmission/reception switching unit 9 into two systems and outputs the signal.

The polarization switching unit 11 includes a delay circuit 23 and a polarization switching switch 24.

The delay circuit 23 is provided to delay the phase of one of the two systems of signals input from the distributor/combiner 10 by 90 degrees.

The polarization switching switch 24 is configured as, for example, a DPDT (Double-Pole/Double-Throw) switch, and has four ports (first port P1, second port P2, third port P3, and fourth port P4).

Figure 12:
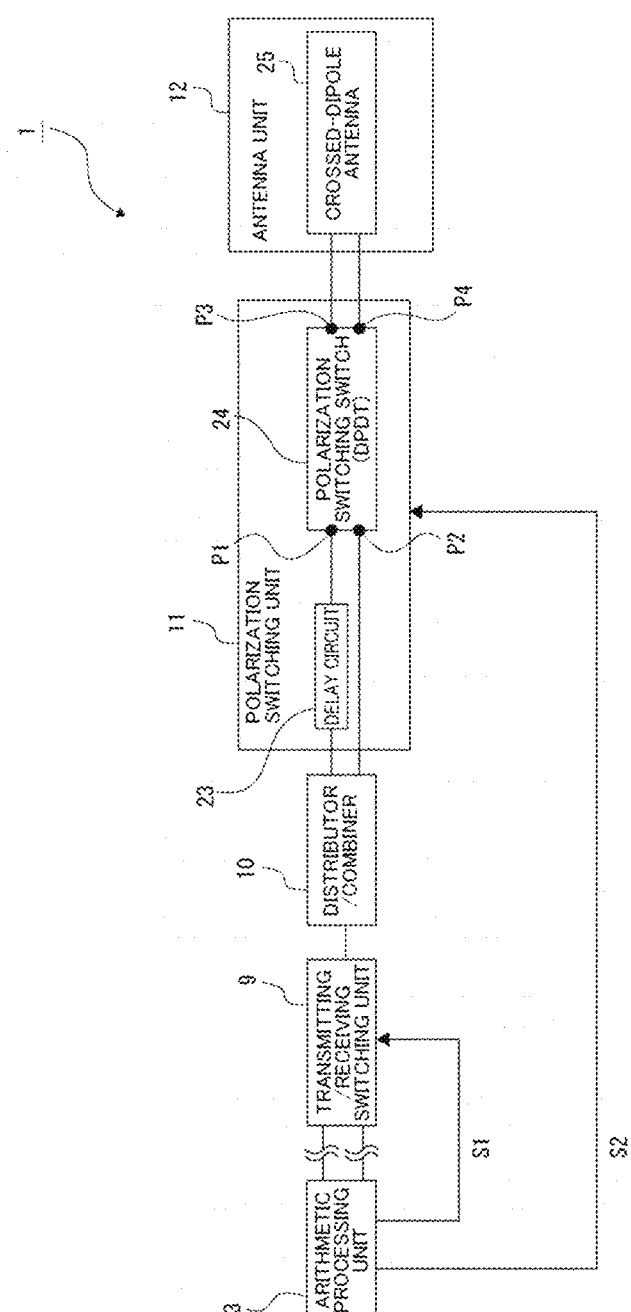
FIG. 12 is a block diagram illustrating an example of a configuration included in a distance measuring device to reduce the influence of multipath.

In the example shown in FIG. 12, the output signal from the distributor/combiner 10 is input to the first port P1 via the delay circuit 23, and the output signal from the distributor/combiner 10 is input to the second port P2. Further, the signal output from the third port P3 is input to the crossed-dipole antenna 25 included in the antenna unit 12.

Figure 13:
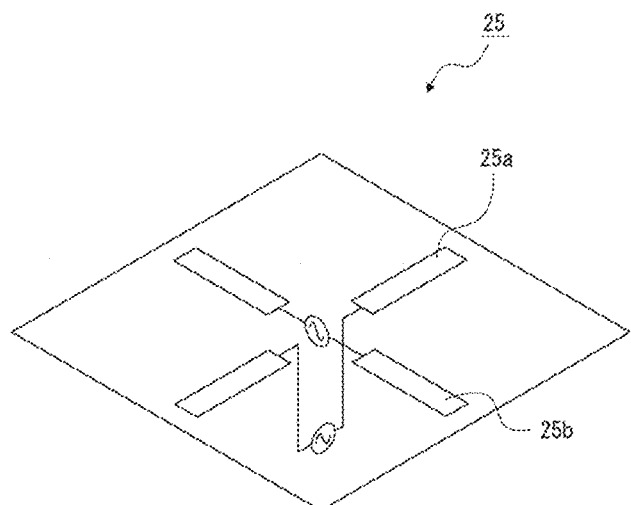
FIG. 13 is a diagram for explaining a crossed-dipole antenna.

Here, the structure of the crossed-dipole antenna 25 will be briefly explained (FIG. 13).

The crossed-dipole antenna 25 has a structure in which two sets of dipole antennas 25a and 25b are arranged orthogonally at 90 degrees.

Here, by setting the phase difference between the power feeding signal supplied to the dipole antenna 25a and the power feeding signal supplied to the dipole antenna 25b to be 90 degrees, it is possible to make the radio waves radiated from the crossed-dipole antenna 25 circularly polarized.

In addition, when the power feeding signal supplied to the dipole antenna 25a is set to +90 degrees and −90 degrees with respect to the power feeding signal supplied to the dipole antenna 25b, the circularly polarized waves of the radiated radio waves can be switched between RHCP and LHCP. In other words, by switching the method of feeding power to the crossed-dipole antenna 25, it is possible to switch between radio wave radiation in the first mode M1 and radio wave radiation in the second mode M2.

That is, to continue the explanation by returning to FIG. 12, when a signal whose phase is delayed by 90 degrees by the delay circuit 23 is supplied from the third port P3 to the antenna unit 12 and when the signal is supplied from the fourth port P4 to the antenna unit 12, the radio waves radiated from the antenna unit 12 are switched between RHCP and LHCP.

The polarization switching switch 24 is a switch for switching between RHCP and LHCP, and switches between a mode in which the signal input to the first port P1 is connected to the third port P3 and the signal input to the second port P2 is connected to the fourth port P4, and a mode in which the signal input to the first port P1 is connected to the fourth port P4 and the signal input to the second port P2 is connected to the third port P3.

Specifically, based on the polarization switching signal S2 supplied by the arithmetic processing unit 3, the polarization switching switch 24 switches the connection mode between the first port P1 and the second port P2 and the third port P3 and the fourth port P4 to thereby switch between the first mode M1 in which communication is performed using RHCP radio waves and the second mode M2 in which communication is performed using LHCP radio waves.

Next, the operation of each unit when the transmission/reception switching unit 9 is switched to the reception mode will be explained.

In the crossed-dipole antenna 25 of the antenna unit 12, signals with a phase shift of 90 degrees from the dipole antennas 25a and 25b are input to the polarization switching switch 24.

Here, it is assumed that the polarization switching signal S2 for switching to the first mode M1 for receiving RHCP radio waves is supplied from the arithmetic processing unit 3 to the polarization switching switch 24.

At this time, for example, when ideal RHCP radio waves are being received, the signal output from the first port P1 via the delay circuit 23 and the signal output from the second port P2 are in phase.

When receiving data, the distributor/combiner 10 combines the two systems of signals output from the polarization switching unit 11 into one system of signals, and outputs the signal to the transmission/reception switching unit 9.

Therefore, both signals are combined in the distributor/combiner 10 and output as a received signal to the transmission/reception switching unit 9 at the subsequent stage.

On the other hand, when ideal LHCP radio waves are being received, the signal output from the first port P1 via the delay circuit 23 and the signal output from the second port P2 have opposite phases.

Therefore, both signals are combined in the distributor/combiner 10 and cancel each other, so that no signal is output to the transmission/reception switching unit 9.

It is also assumed that the polarization switching signal S2 for switching to the second mode M2 for receiving LHCP radio waves is supplied from the arithmetic processing unit 3 to the polarization switching switch 24.

At this time, for example, when ideal LHCP radio waves are being received, the signal output from the first port P1 via the delay circuit 23 and the signal output from the second port P2 are in phase.

Therefore, both signals are combined in the distributor/combiner 10 and output as a received signal to the transmission/reception switching unit 9 at the subsequent stage.

On the other hand, when ideal RHCP radio waves are being received, the signal output from the first port P1 via the delay circuit 23 and the signal output from the second port P2 have opposite phases.

Therefore, both signals are combined in the distributor/combiner 10 and cancel each other, so that no signal is output to the transmission/reception switching unit 9.

In this way, by switching the mode of the polarization switching unit 11 using the polarization switching signal S2 from the arithmetic processing unit 3, which of the RHCP radio waves and the LHCP radio waves are to be received is switched.

The transmission/reception switching unit 9 outputs the signal from the distributor/combiner 10 to the reception amplifier 15 when switched to the reception mode by the transmission/reception switching signal S1.

In the description here, it is stated that no signal is output from the distributor/combiner 10 when ideal LHCP radio waves are received in the first mode M1, or when ideal RHCP radio waves are received in the second mode M2.

However, in a real environment, the radio waves received by the antenna unit 12 are a mixture of various radio waves and noise.

Therefore, even if the RHCP radio waves radiated from the base station 2 are received in the unsupported second mode M2, some signal is output from the distributor/combiner 10. Similarly, even if the LHCP radio waves radiated from the base station 2 are received in the unsupported first mode M1, some signal is output from the distributor/combiner 10.

In the following description, the case where the RHCP radio waves radiated from the base station 2 are received in the first mode M1 and the case where the LHCP radio waves are received in the second mode M2, that is, the case where the radio waves are received in the supported mode, will be referred to as "reception in supported mode".

In addition, regarding the case where the RHCP radio waves radiated from the base station 2 are received in the second mode M2, the case where the LHCP radio waves are received in the first mode M1, that is, the case where the radio waves are received in an unsupported mode, will be referred to as "reception in unsupported mode".

4. Direct-Wave Component Identification Method

As mentioned above, in order to perform distance measurement and positioning with high accuracy, when receiving radio waves containing a mixture of various radio waves and noise, it is important to identify the direct-wave component of the radio waves radiated from the base station 2.

In the present embodiment, in order to identify the direct-wave component, a time waveform obtained by receiving radio waves in a supported mode and a time waveform obtained by receiving radio waves in an unsupported mode are used.

Here, the time signal obtained by receiving radio waves in the first mode M1 for receiving RHCP radio waves is defined as the first time waveform, and the time signal obtained by receiving radio waves in the second mode M2 is defined as the second time waveform.

That is, when the radio waves radiated by the base station 2 are RHCP radio waves, the first time waveform is a time waveform based on reception in a supported mode, and the second time waveform is a time waveform based on reception in a unsupported mode.

On the other hand, when the radio waves radiated by the base station 2 are LHCP radio waves, the first time waveform is a time waveform based on reception in a unsupported mode, and the second time waveform is a time waveform based on reception in a supported mode.

Several methods will now be described with reference to the accompanying figures.

4-1. First Method

A first method for identifying the direct-wave component uses a noise determination threshold Th1. Here, a case where the base station 2 radiates RHCP radio waves will be described.

Figure 14:
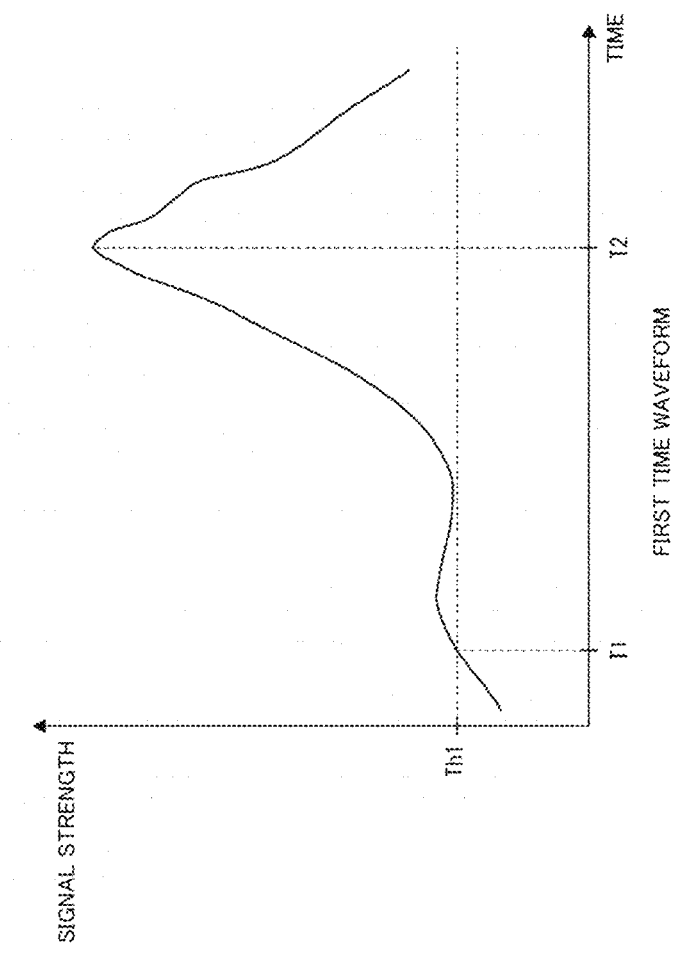
FIG. 14 is a diagram showing an example of a first time waveform obtained when a first method is used as a direct-wave component identification method.

FIG. 14 shows a first time waveform, which is a time waveform based on reception in a supported mode.

Figure 15:
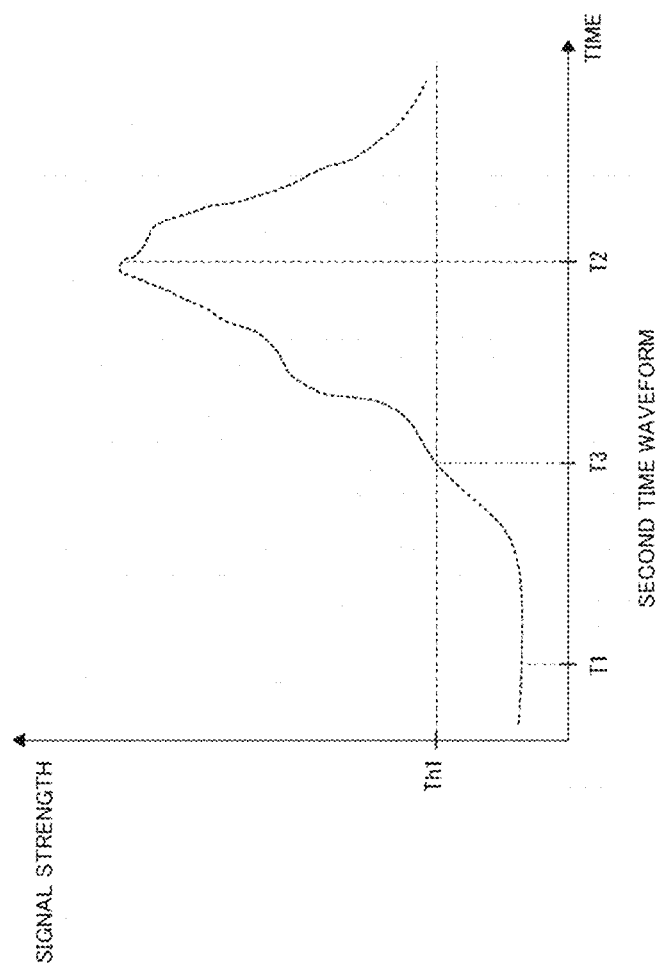
FIG. 15 is a diagram showing an example of a second time waveform obtained when the first method is used as a direct-wave component identification method.

Further, FIG. 15 shows a second time waveform, which is a time waveform based on reception in an unsupported mode.

In both figures, the horizontal axis represents time, and the vertical axis represents the signal strength of the received signal. The noise determination threshold Th1 is a threshold for determining whether the received signal is noise. Specifically, if the noise determination threshold Th1 is not exceeded, it is determined that only noise is being received. If the noise determination threshold Th1 is exceeded, it is determined that a signal other than noise, that is, a signal that should be received is being received.

In the first time waveform shown in FIG. 14, the signal strength of the received signal exceeds the noise determination threshold Th1 at time T1. Therefore, it is determined that the signal received after time T1 contains a direct-wave component. In the following description, the period during which direct waves are being received will be referred to as "direct wave reception period Tr." Moreover, in the first time waveform shown in FIG. 14, since the peak is located at time T2, there is a possibility that it will be determined that a direct wave is being received near time T2.

By the way, in the present embodiment, the direct-wave component is determined using also the second time waveform, which is a time waveform based on reception in an unsupported mode.

In the second time waveform shown in FIG. 15, the signal strength of the received signal exceeds the noise determination threshold Th1 at time T3.

Figure 16:
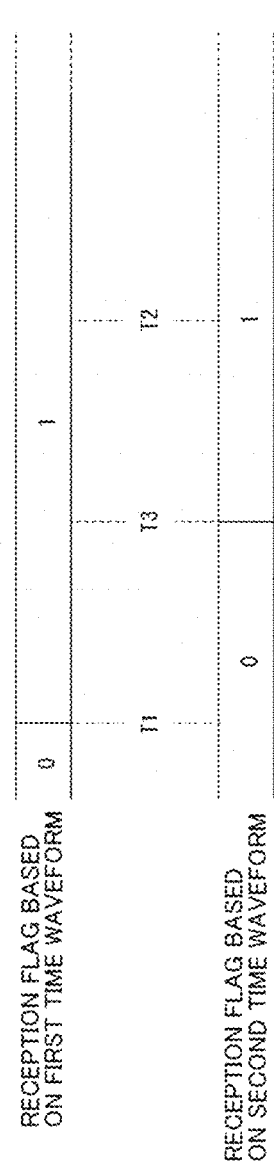
FIG. 16 is a diagram showing changes in a reception flag when the first method is used as a direct-wave component identification method.

FIG. 16 shows the result of determining the reception flag of the direct-wave component (the period during which a direct wave is being received is set to 1, and the rest is set to 0) based on the first time waveform in FIG. 14 and the result of determining the reception flag of the direct-wave component based on the second time waveform in FIG. 15.

As shown in the figure, around time T2, the reception flag is set to "1" for both the first time waveform and the second time waveform. Therefore, it can be determined that a peak was formed during this period due to reception of many noise components.

On the other hand, in the period between time T1 and time T3, the reception flag is set to "0" in the second time waveform, which is a time waveform based on reception in the unsupported mode, whereas the reception flag is set to "1" in the first time waveform, which is a time waveform based on reception in the supported mode.

That is, it can be determined that, as shown in FIG. 14, the received signal that is likely to be buried in noise contains a direct-wave component, and the period from time T1 to time T3 is the direct wave reception period Tr, or a period including the direct wave reception period Tr.

That is, by using both the first time waveform and the second time waveform, it is possible to avoid erroneous determination of the direct wave reception period Tr based on the peak of the received waveform.

4-2. Second Method

A first method for identifying the direct-wave component uses a difference waveform obtained by calculating the difference between the first time waveform and the second time waveform. Here, a case where the base station 2 radiates RHCP radio waves will be described. This method is suitable in an environment where the same level of noise is received in both the first mode M1 and the second mode M2.

Figure 17:
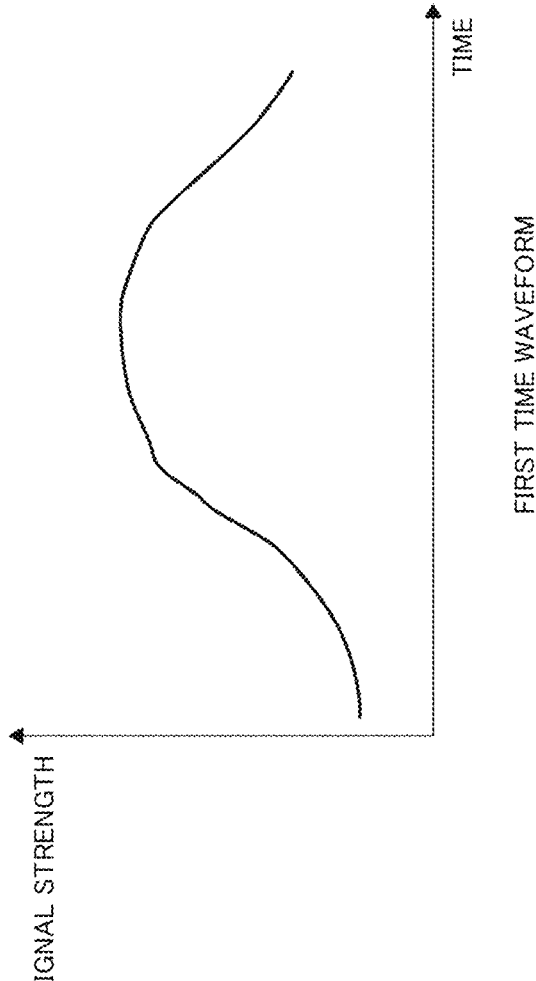
FIG. 17 is a diagram showing an example of a first time waveform obtained when a second method is used as a direct-wave component identification method.

FIG. 17 shows a first time waveform, which is a time waveform based on reception in a supported mode.

Figure 18:
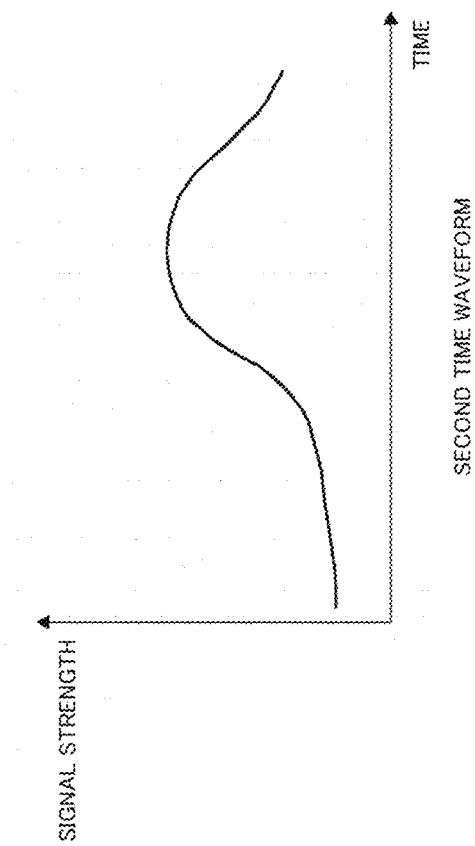
FIG. 18 is a diagram showing an example of a second time waveform obtained when the second method is used as a direct-wave component identification method.

Further, FIG. 18 shows a second time waveform, which is a time waveform based on reception in an unsupported mode.

In both figures, the horizontal axis represents time, and the vertical axis represents the signal strength of the received signal.

In the first time waveform shown in FIG. 17, a distorted waveform is observed, making it difficult to accurately identify the direct wave reception period Tr.

Therefore, the second time waveform in the unsupported mode is acquired, and the difference is calculated to obtain a difference waveform. An example of the difference waveform is shown in FIG. 19.

As shown in the figure, the noise component is canceled and the direct-wave component can be identified with high accuracy.

Figure 19:
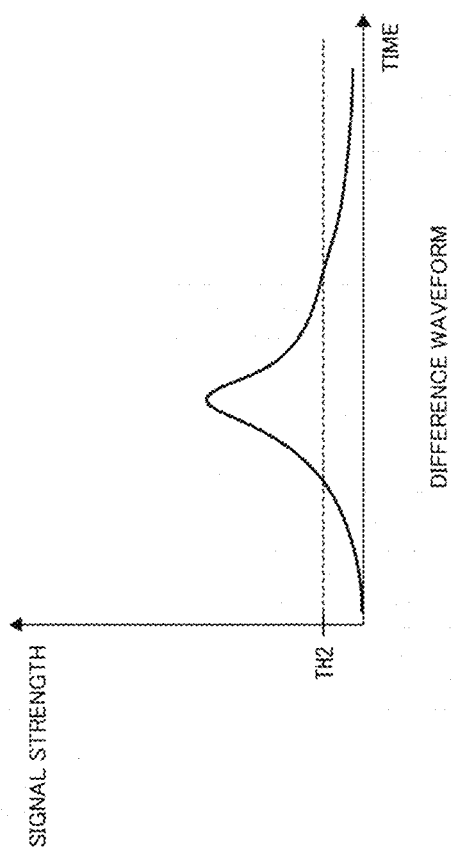
FIG. 19 is a diagram showing an example of a difference waveform obtained when the second method is used as a direct-wave component identification method.

Note that in order to detect the rise of the direct-wave component, a detection threshold Th2 may be used for determination (see FIG. 19).

4-3. Distance Measurement Method

After identifying the direct-wave component using the first or second method, processing of measuring the distance to the base station 2 is performed. The horizontal axis in each of FIGS. 14 to 19 is a time axis, which can be expressed as an axis representing the distance to the base station 2. Specifically, the distance to the base station 2 can be calculated by multiplying the time when the direct-wave component was detected by the speed of light.

Note that positioning can be performed by measuring distances to a plurality of base stations 2 using this method.

5. Processing Flow

Figure 20:
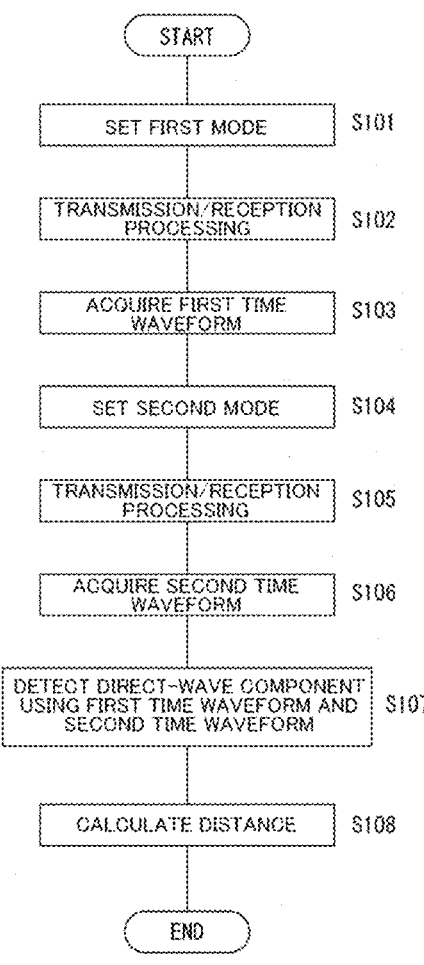
FIG. 20 is a flowchart showing the flow of processing executed by the distance measuring device to perform distance measurement.

The flow of processing executed by the arithmetic processing unit 3 (CPU 71) of the distance measuring device 1 to perform distance measurement will be described with reference to FIG. 20.

In step S101, the arithmetic processing unit 3 sets the first mode M1 to receive RHCP radio waves.

Subsequently, the arithmetic processing unit 3 performs transmission/reception processing in step S102. In the transmission/reception processing, the distance measuring device 1 receives the RHCP radio waves transmitted from the base station 2, and the base station 2 receives the radio waves transmitted by the distance measuring device 1.

This processing is performed to obtain the phase θ for each frequency within a predetermined frequency band. In this way, it is possible to obtain the phase characteristics of the signal propagation path with respect to the frequency.

In step S103, the arithmetic processing unit 3 obtains a first time waveform as shown in FIGS. 14 and 17 from the phase characteristics.

In step S104, the arithmetic processing unit 3 sets the second mode M2 in order to receive the LHCP radio waves.

The arithmetic processing unit 3 performs transmission/reception processing in step S105. The transmission/reception processing is performed between the base station 2 and the distance measuring device 1 similarly to step S102.

In step S106, the arithmetic processing unit 3 obtains a second time waveform as shown in FIGS. 15 and 18 from the phase characteristics.

In step S107, the arithmetic processing unit 3 detects a direct-wave component using the first time waveform and the second time waveform. Specifically, as described above, a reception flag may be used, or a difference waveform may be calculated and used.

In step S108, the arithmetic processing unit 3 calculates the distance based on the detection result of the direct-wave component.

6. Modified Example

Various modified examples will be explained.

6-1. First Modified Example

In the above-described example, the distance measuring device 1 receives either RHCP or LHCP radio waves transmitted from the base station 2 while switching between the first mode M1 and the second mode M2. For example, in the above-mentioned example, the base station 2 is capable of transmitting only RHCP radio waves, and the distance measuring device 1 receives RHCP radio waves in the first mode M1 as well as in the second mode M2.

In the first modified example, the base station 2 can transmit both RHCP radio waves and LHCP radio waves, and a distance measuring device 1A can receive only either the RHCP radio waves or the LHCP radio waves. That is, the distance measuring device 1A can take only one of the first mode M1 and the second mode M2.

Figure 21:
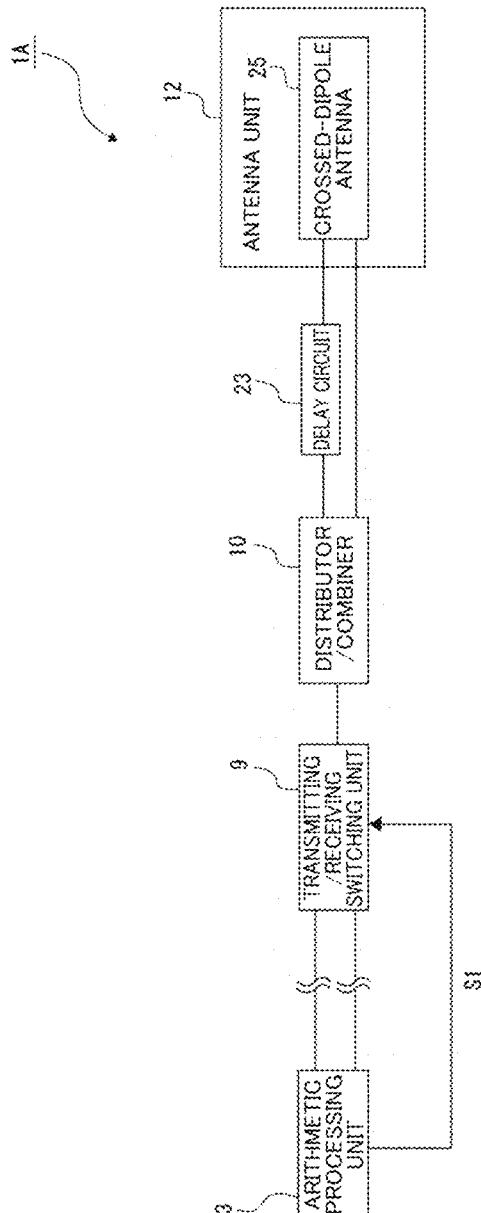
FIG. 21 is an example of a configuration included in a distance measuring device to reduce the influence of multipath and this figure is a block diagram showing an example of a configuration included in a distance measuring device that does not switch polarization.

FIG. 21 shows an example of a configuration of the distance measuring device 1A. Note that in FIG. 21, as in FIG. 12, the configuration of each unit provided between the arithmetic processing unit 3 and the transmission/reception switching unit 9 is omitted.

Since the distance measuring device 1A does not include the polarization switching unit 11, it is possible to transmit and receive using only one of the RHCP radio waves and the LHCP radio waves.

By switching the radio waves transmitted on the base station 2 side between RHCP and LHCP, the distance measuring device 1A can obtain a first time waveform based on reception in the supported mode and a second time waveform based on reception in the unsupported mode.

As described above, even if the distance measuring device 1 is configured to be able to switch between the first mode M1 and the second mode M2, the same thing as this modified example can be achieved by fixing it to either mode.

6-2. Second Modified Example

The distance measuring device 1 described above is equipped with the distributor/combiner 10 and the polarization switching unit 11, thereby making it possible to transmit and receive RHCP radio waves and LHCP radio waves.

A distance measuring device 1B in the second modified example includes a polarization switching switch 24B and a hybrid coupler 26 instead of the distributor/combiner 10 and the polarization switching unit 11.

Figure 22:
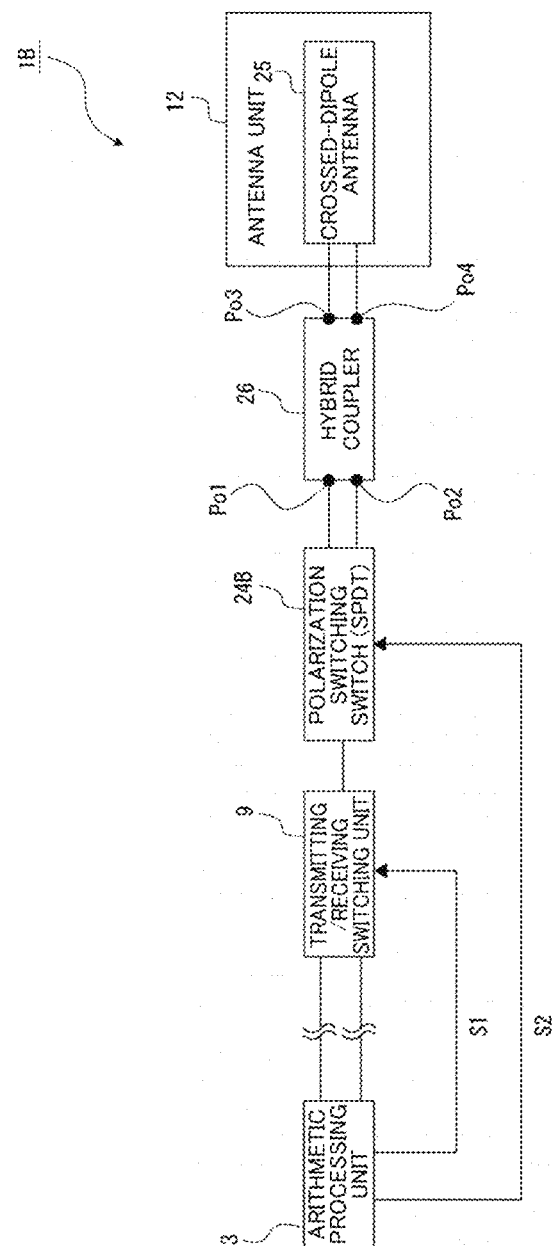
FIG. 22 is an example of a configuration of a distance measuring device to reduce the influence of multipath, and this figure is a block diagram showing an example of a configuration of a distance measuring device having a hybrid coupler.

FIG. 22 shows an example of a configuration of the distance measuring device 1B. Note that, in FIG. 22, as in FIGS. 12 and 21, the configuration of each unit provided between the arithmetic processing unit 3 and the transmission/reception switching unit 9 is omitted.

The distance measuring device 1B includes a polarization switching switch 24B and a hybrid coupler 26.

The polarization switching switch 24B is configured as an SPDT switch or the like, and functions as the polarization switching unit 11 in FIG. 3.

The hybrid coupler 26 includes four ports: a first port Po1, a second port Po2, a third port Po3, and a fourth port Po4.

The two ports on the double-throw side of the polarization switching switch 24B are connected to the first port Po1 and the second port Po2, respectively. The hybrid coupler 26 can adjust the phase difference between the signal output from the third port Po3 and the signal output from the fourth port Po4 to 90 degrees.

The behavior when the distance measuring device 1B transmits RHCP or LHCP radio waves will be explained.

In the hybrid coupler 26 can switch between a case where the signal output from the third port Po3 is advanced by 90 degrees and a case where it is delayed by 90 degrees with respect to the signal output from the fourth port Po4 depending on whether the signal is input to the first port Po1 or the signal is input to the second port Po2.

That is, the polarization switching switch 24B switches whether to output the signal to the first port Po1 or the second port Po2 based on the polarization switching signal S2 supplied from the arithmetic processing unit 3 whereby the phase difference between the two signals output from the hybrid coupler 26 can be switched between 90 degrees and −90 degrees.

In this way, the radio waves output from the crossed-dipole antenna 25 can be switched between RHCP and LHCP.

Next, the behavior when the distance measuring device 1B receives radio waves transmitted from the base station 2 will be explained.

One of the two signals output from the crossed-dipole antenna 25 is input to the third port Po3 of the hybrid coupler 26, and the other is input to the fourth port Po4. Furthermore, the phase difference between the two output signals is switched between 90 degrees and −90 degrees depending on whether the crossed-dipole antenna 25 receives RHCP radio waves or LHCP radio waves.

The hybrid coupler 26 outputs a signal from the first port Po1 when the signal input to the third port Po3 is delayed by 90 degrees from the signal input to the fourth port Po4. At this time, no signal is output from the second port Po2.

Further, the hybrid coupler 26 outputs a signal from the second port Po2 when the signal input to the third port Po3 is advanced by 90 degrees from the signal input to the fourth port Po4. At this time, no signal is output from the first port Po1.

Therefore, the arithmetic processing unit 3 can achieve a configuration in which either RHCP or LHCP radio waves can be received by performing switching according to the polarization switching signal S2 so that the polarization switching switch 24B receive only the output signal from the first port Po1. In addition, the arithmetic processing unit 3 can achieve a configuration in which the other circularly polarized radio waves can be received by performing switching according to the polarization switching signal S2 so that the polarization switching switch 24B receive only the output signal from the second port Po2.

That is, the arithmetic processing unit 3 can switch between the first mode M1 and the second mode M2 using the polarization switching signal S2.

Even if such a configuration is adopted, the above-mentioned effects can be obtained.

6-3. Third Modified Example

In the example described above, the antenna unit 12 includes only one antenna (crossed-dipole antenna 25), but an antenna unit 12C in a distance measuring device 1C in the third modified example includes two crossed-dipole antennas 25R and 25L.

Figure 23:
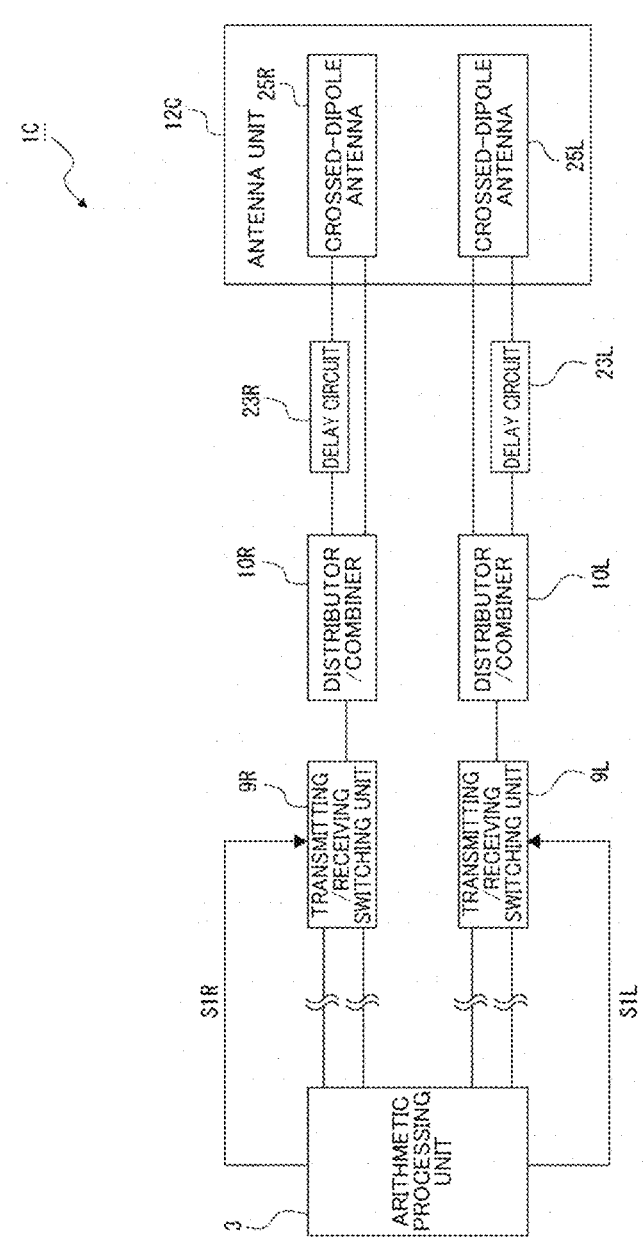
FIG. 23 shows an example of a configuration of a distance measuring device to reduce the influence of multipath and this figure is a block diagram showing an example of a configuration of a distance measuring device that includes both an antenna for right-handed circularly polarized waves and an antenna for left-handed circularly polarized waves.

FIG. 23 shows the configuration of the distance measuring device 1C. Note that, in FIG. 23, as in FIGS. 12, 21, and 22, the configuration of each unit provided between the arithmetic processing unit 3 and the transmission/reception switching unit 9 is omitted.

The configuration of the distance measuring device 1C includes an RHCP configuration and an LHCP configuration for each of the transmission/reception switching unit 9, distributor/combiner 10, delay circuit 23, and crossed-dipole antenna 25.

Specifically, as a configuration for transmitting and receiving RHCP radio waves, the distance measuring device 1C includes a transmission/reception switching unit 9R, a distributor/combiner 10R, a delay circuit 23R, and a crossed-dipole antenna 25R.

Furthermore, as a configuration for transmitting and receiving LHCP radio waves, the distance measuring device 1C includes a transmission/reception switching unit 9L, a distributor/combiner 10L, a delay circuit 23L, and a crossed-dipole antenna 25L.

The arithmetic processing unit 3 switches between a transmission mode and a reception mode in communication using the crossed-dipole antenna 25R by supplying a transmission/reception switching signal S1R to the transmission/reception switching unit 9R.

Further, the arithmetic processing unit 3 switches between a transmission mode and a reception mode in communication using the crossed-dipole antenna 25L by supplying a transmission/reception switching signal S1L to the transmission/reception switching unit 9L.

The configuration of the distance measuring device 1C is such that, for example, when the base station 2 transmits RHCP radio waves, it can perform reception in a supported mode using each unit that supports the transmission and reception of RHCP radio waves, and at the same time, perform reception in an unsupported mode using each unit that supports the transmission and reception of LHCP radio waves.

Therefore, since the above-mentioned first time waveform and second time waveform can be acquired almost simultaneously, for example, even in an environment where noise in the signal propagation path changes over time, the influence of noise variations on the first time waveform and the second time waveform can be minimized. That is, with the configuration of the distance measuring device 1C, it is possible to improve the distance measurement accuracy.

Note that the distance measuring device 1C shown in FIG. 23 is configured to include the transmission/reception switching units 9, distributor/combiners 10, and delay circuits 23 for both RHCP and LHCP, but some of them may be configured to be shared for RHCP and LHCP.

6-4. Fourth Modified Example

The antenna unit 12 (12C) in each of the examples described above was equipped with the crossed-dipole antenna 25 (25R, 25L).

Figure 24:
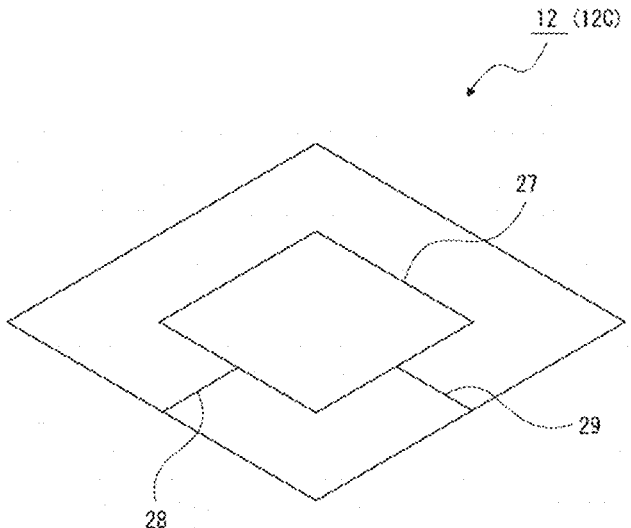
FIG. 24 is a diagram for explaining a patch antenna.

The configuration of the antenna for transmitting and receiving RHCP and LHCP radio waves is not limited to the crossed-dipole antenna. For example, as shown in FIG. 24, a patch antenna 27 may be used.

Specifically, the antenna unit 12 includes a patch antenna 27 formed in a substantially rectangular shape, and a first electric wire 28 and a second electric wire 29 connected to respective electrodes provided on two adjacent sides of the patch antenna 27.

When transmitting radio waves, RHCP or LHCP radio waves can be radiated by supplying signals with a phase difference of 90 degrees to the first electric wire 28 and the second electric wire 29. By switching the phase difference of the signal supplied to the first electric wire 28 with respect to the signal supplied to the second electric wire 29 between +90 degrees and −90 degrees, communication by RHCP radio waves and communication by LHCP radio waves can be switched.

Further, when receiving RHCP or LHCP radio waves, signals with a phase difference of 90 degrees are output from the first electric wire 28 and the second electric wire 29 to the subsequent stage. By appropriately switching the mode in the subsequent stage between the first mode M1 and the second mode M2, it is possible to receive RHCP or LHCP radio waves.

6-5. Others

In each of the above-mentioned examples, the delay circuit 23 (23R, 23L) was provided so that the phase difference was 90 degrees, but it is not necessary to delay one signal so that the phase difference is exactly 90 degrees.

For example, it may be delayed so that the phase difference is between 30 degrees and 150 degrees, or it may be delayed so that the phase difference is between 210 degrees and 330 degrees.

Furthermore, switching from a mode in which RHCP radio waves are radiated to a mode in which LHCP radio waves are radiated during transmission can be realized by changing from a state in which the phase difference between the two signals supplied to the antenna unit 12 (12C) is between 30 degrees and 150 degrees to a state in which the phase difference is between 210 degrees and 330 degrees.

7. Summary

As described in the respective examples described above, the distance measuring device 1 (1A, 1B, 1C) includes: a communication processing unit F1 that performs first radio communication (transmission/reception based on RHCP) using right-handed circularly polarized waves and second radio communication (reception/reception based on LHCP) using left-handed circularly polarized waves as communication for distance measurement using a phase-based method with another device (for example, the base station 2); and a distance measuring unit F4 that measures a distance to the other device based on a first time waveform (see FIGS. 14 and 17) obtained by performing inverse Fourier transform on frequency characteristics of a signal transmission path obtained based on a received signal by the first radio communication and a second time waveform (see FIGS. 15 and 18) obtained by performing inverse Fourier transform on frequency characteristics of a signal transmission path obtained based on a received signal by the second radio communication.

For example, direct-wave components from other devices can be identified using a first time waveform when receiving circularly polarized radio waves that are easier for the antenna to receive among right-handed circularly polarized waves and left-handed circularly polarized waves and a second time waveform when receiving circularly polarized radio waves that are harder for the antenna to receive (or vice versa).

In this way, it is possible to calculate the distance to the other device with high accuracy. Furthermore, since the primary reflected wave component can be excluded, it is possible to further improve the distance measurement accuracy.

As described in the first modified example with reference to FIG. 21 and the like, the first radio communication may be communication for receiving right-handed circularly polarized (RHCP) radio waves, and The second radio communication is communication for receiving left-handed circularly polarized (LHCP) radio waves. The first time waveform and the second time waveform can be obtained by receiving two types of radio waves, right-handed circularly polarized waves and left-handed circularly polarized waves, transmitted from another device (the base station 2) using an antenna (the crossed-dipole antenna 25R or 25L) that supports either circular polarization. By using these two time waveforms, direct waves from other devices can be identified, making it possible to perform highly accurate distance measurement.

As described in the first modified example with reference to FIG. 21 and the like, the distance measuring device 1A may include a signal receiving unit (for example, the antenna unit 12, the polarization switching unit 11, and the distributor/combiner 10) that supports either right-handed circularly polarized (RHCP) radio waves or left-handed circularly polarized (LHCP) radio waves radiated from the other device (the base station 2).

More specifically, the distance measuring device 1A may include an antenna unit 12 that outputs received signals with a phase difference based on reception of radio waves and a combining unit (the delay circuit 23 and the distributor/combiner 10) that combines received signals output from the antenna unit 12, and the combining unit may support reception of either right-handed circularly polarized (RHCP) radio waves or left-handed circularly polarized (LHCP) radio waves.

As a result, when the base station 2 sequentially radiates both right-handed circularly polarized radio waves and left-handed circularly polarized radio waves, as for the reception of either one of the radio waves in the antenna unit 12, the rotation direction of the circular polarization as the direct-wave component is opposite to the rotation direction of the circular polarization supported by the antenna unit 12. Therefore, one of the first time waveform and the second time waveform does not contain many direct-wave components but contains many noise components, and it becomes possible to specify the noise component.

As explained with reference to FIGS. 12, 22, and the like, the distance measuring device 1 (1B, 1C) may include an antenna unit 12 that outputs received signals when receiving radio waves; a combining unit (the distributor/combiner 10 and the delay circuit 23) that combines the received signals output from the antenna unit 12; and a switching unit F2 that switches between a first mode M1 in which the combining unit performs synthesis corresponding to reception of right-handed circularly polarized (RHCP) radio wave signals and a second mode M2 in which the combining unit performs synthesis corresponding to reception of left-handed circularly polarized (LHCP) radio wave signals, the first radio communication may be radio wave communication performed in a state switched to the first mode M1, and the second radio communication is radio wave communication performed while the mode is switched to the second mode M2.

That is, the switching unit F2 switches the polarization switching unit 11 or the polarization switching switch 24B to the first mode M1 so that the combining unit performs synthesis corresponding to the reception of right-handed circularly polarized radio waves, and switches the polarization switching unit 11 or the polarization switching switch 24B to the second mode M2 so that the combining unit performs synthesis corresponding to reception of left-handed circularly polarized radio waves.

In this way, either the right-handed circularly polarized radio waves or left-handed circularly polarized radio waves transmitted from another device (the base station 2) can be received in the first mode M1 and the second mode M2.

As described with reference to FIGS. 14 to 19 as the direct-wave component identification method, the first radio communication may be communication in which specific circularly polarized waves which are either right-handed circularly polarized waves (RHCP) or left-handed circularly polarized waves (LHCP) are received in a state where the combining unit (the delay circuit 23 and the distributor/combiner 10) is switched to the first mode M1, and the second radio communication may be communication in which the specific circularly polarized radio waves are received in a state where the combining unit is switched to the second mode M2.

As a result, radio waves received from another device (base station 2) are received in both a mode in which the rotation directions of circularly polarized waves match each other (supported mode) and a mode in which the rotation directions do not match (unsupported mode), and the first time waveform and the second time waveform are obtained. Therefore, direct waves from other devices can be identified, making it possible to perform highly accurate distance measurement.

As described with reference to FIGS. 12, 13, and 24 and the like, the antenna unit 12 (12C) included in the distance measuring device 1 (1A, 1B, 1C) may be either a crossed-dipole antenna 25 (25R, 25L) or a patch antenna 27.

In this way, it is possible to perform highly accurate distance measurement using the crossed-dipole antenna 25 and the patch antenna 27.

Figure 25:
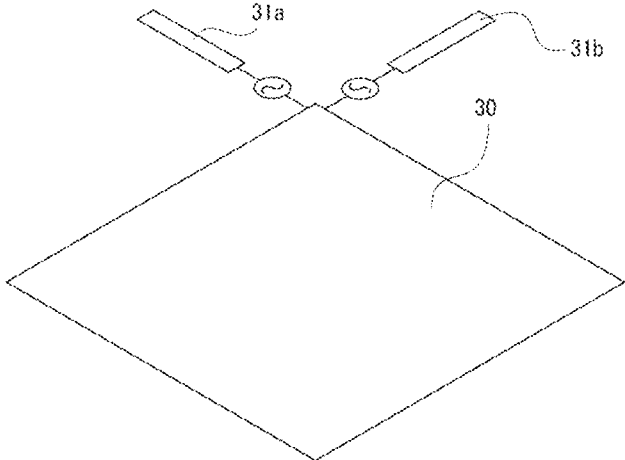
FIG. 25 is a diagram showing an example using two sets of monopole antennas.
Figure 26:
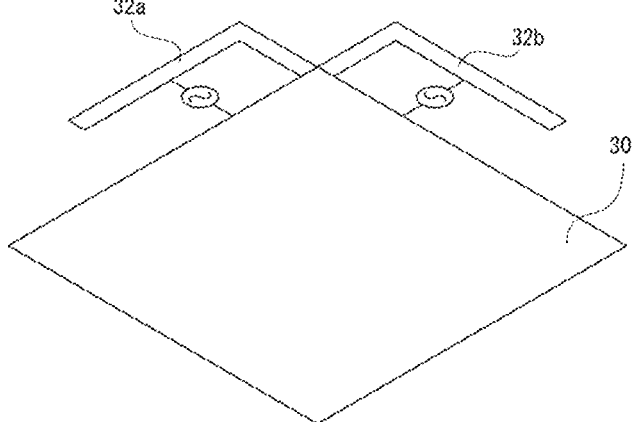
FIG. 26 is a diagram showing an example using two sets of inverted F-antennas.
Figure 27:
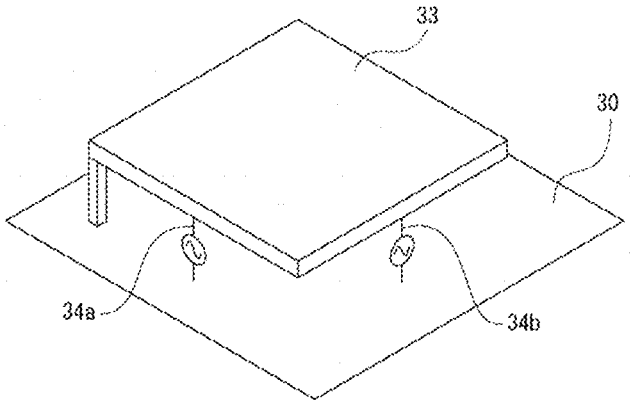
FIG. 27 is a diagram showing an example using a plate-shaped inverted F-antenna.

Further, the distance measuring device 1 may have a structure using two sets of monopole antennas instead of the crossed-dipole antenna 25. Specifically, as shown in FIG. 25, the antenna unit is configured with a ground plate 30 and two sets of monopole antennas 31a and 31b, and power feeding signals with a phase difference of 90 degrees are applied to the monopole antennas 31a and 31b. Alternatively, the distance measuring device 1 may have a structure using two sets of inverted F-antennas instead of the crossed-dipole antenna 25. Specifically, as shown in FIG. 26, the antenna unit is configured with a ground plate 30 and two sets of inverted F-antennas 32a and 32b, and power feeding signals with a phase difference of 90 degrees are applied to the inverted F-antennas 32a and 32b. Further, the distance measuring device 1 may be configured to include a plate-shaped inverted F-antenna instead of the patch antenna 27. Specifically, as shown in FIG. 27, the antenna unit includes a ground plate 30 and a plate-shaped inverted F-antenna 32, and signals with a phase difference of 90 degrees are supplied to a first electric wire 34a and a second electric wire 34b that supply signals to the plate-shaped inverted F-antenna 32.

These modified examples are merely examples, and high-accuracy distance measurement in the distance measuring device 1 may be realized by employing various other antenna configurations.

As described with reference to FIG. 13 and the like, the switching unit F2 may switch between radiation of radio waves in the first mode M1 and radiation of radio waves in the second mode M2 by switching a power feeding method to the antenna unit 12 (12C).

For example, when the antenna unit 12 is configured with two sets of dipole antennas 25a and 25b, the phase difference between the feeding signals applied to the first dipole antenna 25a and the second dipole antenna 25b is set to 90 degrees. At this time, by switching between a power feeding method in which the power is fed so that the phase of the feeding signal to the first dipole antenna 25a advances by 90 degrees and a power feeding method in which power is fed so that the phase of the feeding signal to the second dipole antenna 25b advances by 90 degrees, it is possible to switch between radio wave radiation in the first mode M1 and radio wave radiation in the second mode M2.

In this way, it is possible to switch between communication using right-handed circularly polarized (RHCP) radio waves and communication using left-handed circularly polarized (LHCP) radio waves.

Further, when the antenna unit 12 is a patch antenna 27, power feeding signals with a phase shift of 90 degrees are supplied to two electrodes provided on the patch antenna 27. By switching the power feeding signals supplied to the two electrodes, it is possible to switch between radio wave radiation in the first mode M1 and radio wave radiation in the second mode M2.

By switching the mode, it is possible to switch between communication using right-handed circularly polarized radio waves and communication using left-handed circularly polarized radio waves.

As described elsewhere, the switching unit F2 may switch the mode by switching from a state in which a phase difference between two types of power feeding signals supplied to the antenna unit 12(12C) is 30 degrees or more and 150 degrees or less to a state in which the phase difference is 210 degrees or more and 330 degrees or less.

In this way, it is possible to switch radio wave communication from communication using right-handed circularly polarized waves (RHCP) to communication using left-handed circularly polarized waves (LHCP), or vice versa.

As described in the second modified example with reference to FIG. 23 and the like, the distance measuring device 1B may include a switch element (the polarization switching switch 24B); and a hybrid coupler 26 that distributes signals input from the switch element and supplies the signals to the antenna unit 12 (12C), combines received signals output from the antenna unit 12, and outputs the combined signal to the switch element, and the switching unit F2 may switch the mode by outputting a switching signal to the switch element.

As a result, it is possible to receive the circularly polarized radio waves corresponding to the mode selected by the switch element among the right-handed circularly polarized (RHCP) radio waves and left-handed circularly polarized (LHCP) radio waves received by the antenna unit 12.

By automatically creating a predetermined phase difference such as 90 degrees in the hybrid coupler 26, the mode can be easily changed by simply switching the switch element.

As described in the third modified example with reference to FIG. 23 and the like, the antenna unit 12C may include a first antenna (the crossed-dipole antenna 25R) capable of transmitting and receiving radio waves in the first mode M1 and a second antenna (the crossed-dipole antenna 25L) capable of transmitting and receiving radio waves in the second mode M2.

By generating a first time waveform based on the received signal from the first antenna and generating a second time waveform based on the received signal from the second antenna, it is possible to specify an antenna suitable for receiving the direct-wave component and perform highly accurate distance measurement.

As described in the first method of the direct-wave component identification method with reference to FIGS. 14 to 16, the distance measuring unit F4 may perform the distance measurement by determining a time period in which the first time waveform and the second time waveform have different determination results as to whether or not a noise determination threshold Th1 has been exceeded as a direct wave reception period Tr.

In this way, a reflected wave component is prevented from being erroneously detected as a direct-wave component, and appropriate distance measurement can be performed.

As described in the second method of the direct-wave component identification method with reference to FIGS. 17 to 19, the distance measuring unit F4 may perform the distance measurement based on a difference between the first time waveform and the second time waveform.

In this way, it becomes possible to specify the direct-wave component, so it is possible to specify the time period in which the direct-wave component is mainly received, and it becomes possible to perform appropriate distance measurement.

Note that the functions as the various distance measuring devices described above can be suitably implemented in a mobile terminal device such as a smartphone or a tablet terminal. In a mobile terminal device, if the position information of the terminal itself can be specified with high accuracy, the usability of various applications can be improved.

For example, when presenting advertisements using position information, it is possible to send appropriate advertising information based on highly accurate position information, and there is no need to send inappropriate advertising information, which improves user convenience and makes effective use of communication bands.

In addition, in an application that performs navigation, it is possible to reduce the presentation of erroneous guidance and prevent the user from making unnecessary movements, and in addition, it is possible to provide an easy-to-use navigation function.

Furthermore, in game applications that use position information, a fair game environment can be provided by using highly accurate position information.

Note that the advantageous effects described in the present specification are merely exemplary and are not limited, and other advantageous effects may be obtained.

Moreover, the above-mentioned examples may be combined in any way, and even when various combinations are used, it is possible to obtain the various effects described above.

8. Present Technology (1)

A distance measuring device including:

a communication processing unit that performs first radio communication using right-handed circularly polarized waves and second radio communication using left-handed circularly polarized waves as communication for distance measurement using a phase-based method with another device; and a distance measuring unit that measures a distance to the other device based on a first time waveform obtained by performing inverse Fourier transform on frequency characteristics of a signal transmission path obtained based on a received signal by the first radio communication and a second time waveform obtained by performing inverse Fourier transform on frequency characteristics of a signal transmission path obtained based on a received signal by the second radio communication.

(2)

The distance measuring device according to (1), wherein the first radio communication is communication that receives right-handed circularly polarized radio waves, and the second radio communication is communication that receives left-handed circularly polarized radio waves.

(3)

The distance measuring device according to (2), further including:

a signal receiving unit that supports either right-handed circularly polarized radio waves or left-handed circularly polarized radio waves radiated from the other device.

(4)

The distance measuring device according to (3), further including:

an antenna unit that outputs two types of received signals with a phase difference based on reception of circularly polarized radio waves, wherein the signal receiving unit includes a combining unit that combines the two types of received signals, and the combining unit performs synthesis corresponding to either right-handed circularly polarized radio waves or left-handed circularly polarized radio waves.

(5)

The distance measuring device according to (1), further including:

an antenna unit that outputs received signals when receiving radio waves;

a combining unit that combines the received signals output from the antenna unit; and a switching unit that switches between a first mode in which the combining unit performs synthesis corresponding to reception of right-handed circularly polarized radio wave signals and a second mode in which the combining unit performs synthesis corresponding to reception of left-handed circularly polarized radio wave signals, wherein the first radio communication is radio wave communication performed in a state switched to the first mode, and the second radio communication is radio wave communication performed in a state switched to the second mode.

(6)

The distance measuring device according to (5), wherein the first radio communication is communication in which specific circularly polarized waves which are either right-handed circularly polarized waves or left-handed circularly polarized waves are received in a state where the combining unit is switched to the first mode, and the second radio communication is communication in which the specific circularly polarized radio waves are received in a state where the combining unit is switched to the second mode.

(7)

The distance measuring device according to any one of (4) to (6), wherein the antenna unit is either a crossed-dipole antenna or a patch antenna.

(8)

The distance measuring device according to (5) or (6), wherein the switching unit switches between radiation of radio waves in the first mode and radiation of radio waves in the second mode by switching a power feeding method to the antenna unit.

(9)

The distance measuring device according to (8), wherein the switching unit switches the mode by switching from a state in which a phase difference between two types of power feeding signals supplied to the antenna unit is 30 degrees or more and 150 degrees or less to a state in which the phase difference is 210 degrees or more and 330 degrees or less.

(10)

The distance measuring device according to (9), further including:

a switch element; and a hybrid coupler that distributes signals input from the switch element and supplies the signals to the antenna unit, combines received signals output from the antenna unit, and outputs the combined signal to the switch element, wherein the switching unit switches the mode by outputting a switching signal to the switch element.

(11)

The distance measuring device according to (5) or (6), wherein the antenna unit includes a first antenna capable of transmitting and receiving radio waves in the first mode and a second antenna capable of transmitting and receiving radio waves in the second mode.

(12)

The distance measuring device according to any one of (1) to (11), wherein the distance measuring unit performs the distance measurement by determining a time period in which the first time waveform and the second time waveform have different determination results as to whether or not a threshold value has been exceeded as a direct wave reception period.

(13)

The distance measuring device according to any one of (1) to (12), wherein the distance measuring unit performs the distance measurement based on a difference between the first time waveform and the second time waveform.

(14)

A distance measurement method for allowing an arithmetic processing device to execute:

communication processing of performing first radio communication using right-handed circularly polarized waves and second radio communication using left-handed circularly polarized waves as communication for distance measurement using a phase-based method with another device; and processing of measuring a distance to the other device based on a first time waveform obtained by performing inverse Fourier transform on frequency characteristics of a signal transmission path obtained based on a received signal by the first radio communication and a second time waveform obtained by performing inverse Fourier transform on frequency characteristics of a signal transmission path obtained based on a received signal by the second radio communication.

REFERENCE SIGNS LIST 1, 1A, 1B, 1C Distance measuring device
2 Base station (other device)
12, 12C Antenna unit
24 Polarization switching switch (switching unit)
24B Polarization switching switch (switch element)
25 Crossed-dipole antenna
25R Crossed-dipole antenna (first antenna)
25L Crossed-dipole antenna (second antenna)
26 Hybrid coupler
27 Patch antenna
M1 First mode
M2 Second mode
Tr Direct wave reception period
F1 Communication processing unit
F2 Switching unit
F4 Distance measuring unit

The invention claimed is:

1. A distance measuring device, comprising:
a communication processing unit that performs first radio communication using right-handed circularly polarized waves and second radio communication using left-handed circularly polarized waves as communication for distance measurement using a phase-based method with another device; and
a distance measuring unit that measures a distance to the other device based on:
a first time waveform obtained by performing inverse Fourier transform on frequency characteristics of a signal transmission path obtained based on a received signal by the first radio communication, and
a second time waveform obtained by performing the inverse Fourier transform on frequency characteristics of a signal transmission path obtained based on a received signal by the second radio communication.

2. The distance measuring device according to claim 1, wherein
the first radio communication is communication for receiving right-handed circularly polarized radio waves, and
the second radio communication is communication for receiving left-handed circularly polarized radio waves.

3. The distance measuring device according to claim 2, further comprising:
a signal receiving unit that supports either the right-handed circularly polarized radio waves or the left-handed circularly polarized radio waves radiated from the other device.

4. The distance measuring device according to claim 3, further comprising:
an antenna unit that outputs two types of received signals with a phase difference based on reception of either the right-handed circularly polarized radio waves or the left-handed circularly polarized radio waves, wherein
the signal receiving unit includes a combining unit that combines the two types of received signals, and
the combining unit performs synthesis corresponding to either the right-handed circularly polarized radio waves or the left-handed circularly polarized radio waves.

5. The distance measuring device according to claim 4, wherein
the antenna unit is either a crossed-dipole antenna or a patch antenna.

6. The distance measuring device according to claim 1, further comprising:
an antenna unit that outputs received signals when receiving radio waves;
a combining unit that combines the received signals output from the antenna unit; and
a switching unit that switches between a first mode in which the combining unit performs synthesis corresponding to reception of right-handed circularly polarized radio wave signals and a second mode in which the combining unit performs synthesis corresponding to reception of left-handed circularly polarized radio wave signals, wherein
the first radio communication is radio wave communication performed in a state switched to the first mode, and
the second radio communication is radio wave communication performed in a state switched to the second mode.

7. The distance measuring device according to claim 6, wherein
the first radio communication is communication in which specific circularly polarized waves which are either the right-handed circularly polarized waves or the left-handed circularly polarized waves are received in a state where the combining unit is switched to the first mode, and
the second radio communication is communication in which specific circularly polarized radio waves are received in a state where the combining unit is switched to the second mode.

8. The distance measuring device according to claim 6, wherein
the switching unit switches between radiation of radio waves in the first mode and radiation of radio waves in the second mode by switching a power feeding method to the antenna unit.

9. The distance measuring device according to claim 8, wherein
the switching unit switches a mode between the first mode and the second mode by switching from a state in which a phase difference between two types of power feeding signals supplied to the antenna unit is 30 degrees or more and 150 degrees or less to a state in which the phase difference is 210 degrees or more and 330 degrees or less.

10. The distance measuring device according to claim 9, further comprising:
a switch element; and
a hybrid coupler that distributes signals input from the switch element and supplies the signals to the antenna unit, combines the received signals output from the antenna unit, and outputs the combined received signals to the switch element, wherein
the switching unit switches the mode by outputting a switching signal to the switch element.

11. The distance measuring device according to claim 6, wherein
the antenna unit includes a first antenna for transmitting and receiving radio waves in the first mode and a second antenna for transmitting and receiving radio waves in the second mode.

12. The distance measuring device according to claim 1, wherein

US 12,669,572 B2

29

30 the distance measuring unit performs the distance measurement by determining a time period in which the first time waveform and the second time waveform have different determination results as to whether or not a threshold value has been exceeded as a direct wave reception period.

13. The distance measuring device according to claim 1, wherein the distance measuring unit performs the distance measurement based on a difference between the first time waveform and the second time waveform.

14. A distance measurement method for allowing an arithmetic processing device to execute:

communication processing of performing first radio communication using right-handed circularly polarized waves and second radio communication using left-handed circularly polarized waves as communication for distance measurement using a phase-based method with another device; and processing of measuring a distance to the other device based on:

a first time waveform obtained by performing inverse Fourier transform on frequency characteristics of a signal transmission path obtained based on a received signal by the first radio communication, and a second time waveform obtained by performing the inverse Fourier transform on frequency characteristics of a signal transmission path obtained based on a received signal by the second radio communication.

* * * * *